United States Patent
Ray et al.

(10) Patent No.: US 8,144,325 B2
(45) Date of Patent: Mar. 27, 2012

(54) IN-FLIGHT MULTIPLE FIELD OF VIEW DETECTOR FOR SUPERCOOLED AIRBORNE WATER DROPLETS

(75) Inventors: Mark D. Ray, Burnsville, MN (US); Michael P. Nesnidal, Shakopee, MN (US)

(73) Assignee: Rosemount Aerospace, Inc., Burnsville, MN (US)

( * ) Notice: Subject to any disclaimer, the term of this patent is extended or adjusted under 35 U.S.C. 154(b) by 477 days.

(21) Appl. No.: 12/508,038

(22) Filed: Jul. 23, 2009

(65) Prior Publication Data

US 2011/0019188 A1 Jan. 27, 2011

(51) Int. Cl.
*G01N 21/00* (2006.01)
*G01J 4/00* (2006.01)

(52) U.S. Cl. ............... 356/342; 356/343; 356/364

(58) Field of Classification Search .............. None
See application file for complete search history.

(56) References Cited

U.S. PATENT DOCUMENTS

| | | |
|---|---|---|
| 4,893,003 A | 1/1990 | Hays |
| 5,239,352 A | 8/1993 | Bissonnette |
| 5,557,040 A | 9/1996 | Inenaga et al. |
| 5,838,239 A | 11/1998 | Stern et al. |
| 5,929,443 A | 7/1999 | Alfano et al. |
| 7,652,584 B2 | 1/2010 | Fridthjof |
| 2008/0117419 A1 | 5/2008 | Hays et al. |
| 2010/0280765 A1 | 11/2010 | Marquardt et al. |

OTHER PUBLICATIONS

European Search Report (EP 10 00 5278), dated Oct. 25, 2011, pp. 1-3.
Luc R. Bissonnette; Estimation of cloud droplet size density distribution from multiple-field-of-view lidar returns; Dec. 1997; pp. 3404-3415; vol. 36 No. 12;Optical Instrumentation Engineers.
Igor Veselovskii; Information content of data measured with a multiple-field-of-view lidar; Sep. 10, 2006; pp. 6839-6848; vol. 48, No. 26; Applied Optics.

*Primary Examiner* — Gregory J Toatley
*Assistant Examiner* — Amanda Merlino
(74) *Attorney, Agent, or Firm* — Womble Carlyle

(57) ABSTRACT

An airborne multiple field-of-view water droplet sensor includes an illumination portion and a detection portion. The illumination portion includes a first optical beam emitter configured to output a light beam. The detection portion includes a kaleidoscope configured to channel a first portion of the backscattered light towards an inner reflective surface of a circle-to-line converter, a multiple field of view subsystem having at least a first detector configured to receive light reflected by the circle-to-line converter, and a single field-of-view subsystem configured to receive a second portion of the backscattered light, the second portion not having been reflected by the circle-to-line converter. The single field-of-view subsystem may include a dual channel circular polarization detector for distinguishing between liquid water droplets and ice crystals based on information in the single field-of-view.

20 Claims, 17 Drawing Sheets

MFOV Detector with Relay Imaging Lenses (Side View)

IN-FLIGHT MULTIPLE FIELD OF VIEW DETECTOR FOR SUPERCOOLED AIRBORNE WATER DROPLETS

CROSS REFERENCE TO RELATED APPLICATIONS

None.

BACKGROUND OF THE INVENTION

1. Field of the Invention

The present invention concerns in-flight sensors on board aircraft for detecting airborne liquid water droplets.

2. Background

The detection of airborne water droplets and their classification according to droplet size is an important function of an in-flight icing conditions detector. Current ice protection devices on aircraft, such as inflatable boots, are well-suited for ice accumulation from small droplets (e.g. <50 μm mean value diameter) but may not provide protection from ice accumulation when the impinging droplets are large. In particular, the ability to discriminate supercooled large droplets (SLD) is quickly becoming recognized as a critical safety feature for an icing conditions sensor. SLD are typically greater than 40 μm diameter and are well below the freezing temperature of water. When they strike the leading edge of an airplane wing, they tend to roll beyond the leading end and freeze in locations inaccessible to anti-icing devices but critical to the control of the aircraft. Supercooled large droplets are believed to have caused some aircraft accidents, such as the fatal crash of an ATR-72 in Roselawn, Ind. in 1994.

Soft targets with a high density of scattering sites (such as clouds) will produce multiple scattering when they are probed by a laser beam. For multiple scattering, light rays experience two or more scattering events before returning to the lidar receiver. Most analyses of lidar multiple scattering assume that each detected ray experiences numerous small-angle forward scatterings (both while propagating away from and towards the lidar) and one single large-angle (~180°) scattering event that is responsible for its backscatter towards the lidar receiver. The small-angle forward scatterings are due primarily to diffraction of the light around the particles, and these small angles are largely responsible for the increased field-of-view of the received light as the laser beam penetrates the soft target. In the process of multiple scattering, the rays diffuse laterally, and the received field-of-view will expand beyond the laser divergence, depending on the size distribution and density of the scattering particles that comprise the soft target.

The general relationship between the particle diameter (d), the laser wavelength ($\lambda$), and the forward-scattering diffraction angle ($\beta$) is $$\beta \propto \frac{\lambda}{d} \quad (1)$$

This is a simple proportional relationship between droplet diameter and scattering angle. Within a cloud, however, there is a distribution of water droplet sizes, and the scattering angles will vary according to this distribution. Generally speaking, however, small particles produce large scattering angles, and vice versa.

FIG. 1 presents a simplified view of the field-of-view as a lidar beam penetrates distance x into a cloud 50 located a distance R from the receiver 52. If the scattering angle is $\beta$, then the field-of-view $\theta$ can be obtained from:

$$\tan(\theta) = \frac{x\tan(\beta)}{(R+x)} \approx \frac{x\lambda}{(R+x)d}, \text{ in the limit of small } \theta \text{ and } \beta \quad (2)$$

For the case that R=1000 m, x=200 m, $\lambda$=1 μm, and d=5 μm (typical of a water cloud), the field of view $\theta$ is approximately 40 mrad, which corresponds to the maximum field-of-view employed by prior art multiple field of view lidar systems. However, for supercooled large droplets, droplet sizes range from 50 μm to over 100 μm. In a cloud of 40 μm droplets, the field-of-view decreases to 5 mrad; for 100 μm and larger, it is less than 2 mrad. The inverse relationship of field-of-view with droplet size means that the multiple fields-of-view generated by large droplets crowd close together near the single-scattering field-of-view generated naturally by the divergence of the laser beam.

FIG. 2 shows how the multiple fields-of-view generated by droplets reflecting backscattered light appears at the focal plane. An outgoing collimated light beam 54 illuminates the droplets and the backscattered light 56 from the droplets passes through one or more receiver lenses 58 after which it is received by in a detector region, generally shown as 60, arranged along the optical axis A. At the upper half of the detector's focal plane 62, multiple fields of view map into concentric rings, generally shown as 64.

The concept behind a multiple field-of-view (MFOV) detector is to place multiple detector elements into the focal plane of the receiver optic and simultaneously measure the backscatter from the various fields of view. In the focal plane, the various FOVs occupy different spatial locations, with the distance from the optical axis (y) being proportional to the FOV according to the relation:

$$y = f\theta \quad (3)$$

where f is the focal length of the receiver optic. For a lidar with a 2" diameter, f/2.5 receiver lens, the displacement is 63 μm for every 0.5 mrad angle with regard to the optical axis of the lidar.

U.S. Pat. No. 5,239,352 (Bissonnette) discloses a prior art receiver for detecting MFOV lidar backscatter. FIGS. 3 and 4 show that this prior art receiver 71 has a multi-element radiation detector 73 located in the focal plane "f" of the receiving optics 72 having optical axis 74. The detector 73 consists of a number of concentric circular silicon detector elements (PIN photodiodes) 73-1, 73-2, 73-3 and 73-4. As a result of the four separate detector elements, the receiver 71 can differentiate received backscattered radiation signals between several fields of view. A backscattered signal received for any field of view larger than the divergence of the lidar's laser beam is due to multiple scattering.

The bandwidth of the detector elements is sufficiently high to ensure range resolution of <5 meters as the beam penetrates the cloud. In this detector, each detector element integrates the signal over a given range of field-of-view and generates a single value. The four concentric detector elements cover the following fields-of-view:

73-1 0-3.75 mrad
73-2 3.75-12.5 mrad
73-3 12.5-25.0 mrad
73-4 25.0-37.5 mrad

Detector element 73-1 measures the entire single scattering signal with some multiple scattering as well; detector elements 73-2 through 73-4 measure only the multiple scattering. However, for the detection of supercooled large droplets, the fixed FOV at 3.75 mrad might be a limitation since most of the useful scattering information may be completely contained within this single FOV, which also contains the entire single scattering signal. Thus, there is no way to distinguish multiple scattering due to large droplets from that due to single scattering. In addition, the FOVs are fixed and cannot be reconfigured.

U.S. Pat. No. 4,893,003 (Hays) discloses a circle-to-line interferometer optical system (CLIO) for use with a Fabry-Perot interferometer. As seen in FIGS. 5-6, a CLIO system includes a conical reflector segment 80 that is provided with an interior conical reflective surface 81. The conical reflective surface 81 is oriented so as to reflect incoming parallel light rays 83 produced by a Fabry-Perot Interferometer and containing circular fringe information 82. The light rays 83 propagate in a direction substantially parallel to a conical axis 84 of the conical reflector segment 80. The circular fringe information 82 is converted into linear information when the reflected light rays 83 are received by a conventional linear array detector 87, such as a charge coupled device of the sort used in spectroscopic analysis. The radii of the interferometer fringes depend on the spacing of the interferometer's reflective surfaces, the speed of the particles that reflect light into the spectrometer, the wavelength of the light, and on the phase coherence of the light entering the interferometer. The apex of the cone may be situated where the conical axis 84 intersects the focal plane of the circular fringe pattern 82. The azimuthal angle of the detected circular fringe pattern 82 may be reduced with the use of a tele-kaleidoscope 86 (FIG. 6) comprising a predetermined arrangement of mirrors 85. A right-angle cone with a reflective surface 81 reflects the circular fringe information into a line in the plane P on which the detector 87 is located. As seen in FIG. 7, the incoming angle $\theta_i$ is reflected onto the plane P at the reflection angle $\theta_r$, thereby producing a one-to-one mapping with information at radius y of the circle entering the cone being detected at a distance x from the cone apex V. Thus, incoming circular fringe information comprising alternating bright and dark regions are detected as alternating bright and dark regions along the linear array detector 87.

SUMMARY OF THE INVENTION

In general terms, the invention is directed to an airborne water droplet sensor which comprises an illumination portion and a detection portion for backscattered light. The device detects the presence of airborne water droplets and provides information reflective of a profile of their diameters by measuring the lateral diffusion of a laser beam as the beam penetrates a cloud. When the device detects the presence of "large" droplets, it may report the finding to a processor that also receives outside air temperature and decides if the droplets qualify as supercooled large droplets. If so, an associated computer takes appropriate action, such as sending an alert to the pilot or activating whatever anti-icing devices might be appropriate for the situation.

In one aspect, the present invention is directed to an airborne multiple field of view water droplet sensor comprising an illumination portion and a detection portion. The illumination portion comprises a first optical beam emitter configured to output a light beam. The detection portion comprises: a window configured to permit backscattered light from water droplets illuminated by said light beam to pass therethrough, a first lens configured to focus said backscattered light after the backscattered light has passed through said window, a kaleidoscope configured to channel a first portion of the backscattered light that has passed through the first lens, towards an inner reflective surface of a circle-to-line converter, a multiple field-of-view subsystem comprising at least a first detector configured to receive light reflected by the circle-to-line converter, and a single field-of-view subsystem configured to receive a second portion of the backscattered light that has passed through the first lens, the second portion not having been reflected by the circle-to-line converter.

The single-field-of-view subsystem may use circularly polarized light to distinguish between water and ice crystals. In such case, the illumination portion further comprises a first linear polarizer configured to receive the light beam and output a linearly polarized illuminating beam a first circular polarization element configured to receive the linearly polarized illuminating beam and output a circularly polarized illuminating beam. Furthermore, the detection portion further comprises a second circular polarization element configured to receive the circularly polarized backscattered light that has passed through the window and output linearly polarized backscattered light, a first polarizing beam splitter configured to split the linearly polarized backscattered light into a first component linearly polarized backscattered light and a second component linearly polarized backscattered light, a first component light detector configured to detect the first component linearly polarized backscattered light and output a first signal in response thereto, a second component light detector configured to detect the second component linearly polarized backscattered light and output a second signal in response thereto, and a processor configured to receive the first and second signals output by respective first and second component light detectors and calculate at least one parameter reflective of an ice condition, based on said first and second signals.

DETAILED DESCRIPTION OF THE INVENTION

The aforementioned U.S. Pat. Nos. 5,239,352 and 4,893,003 are incorporated by reference herein, to the extent necessary to understand the present invention.

In general, most of the relevant droplet size information is contained within a narrow band of angles that lie close to the divergence angle of the laser beam.

Figure 8:
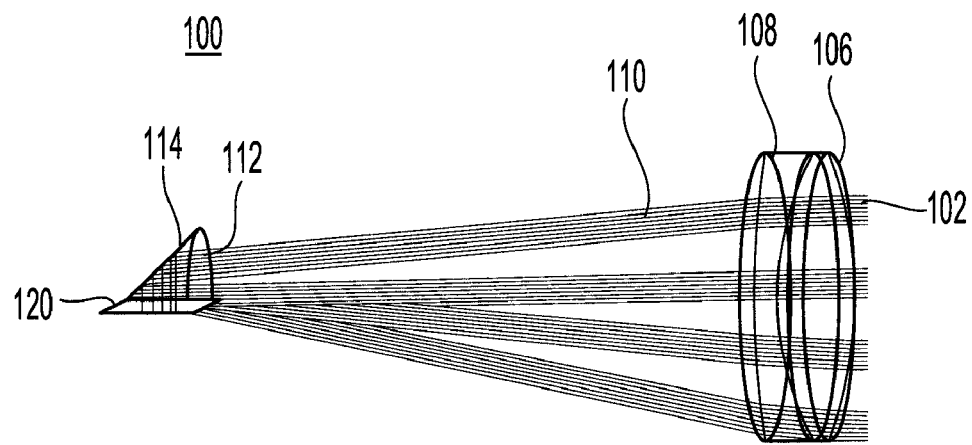
FIG. 8 shows a system for detecting backscattered light in accordance with one embodiment of the invention.

FIG. 8 illustrates the general concept of a system 100 for detecting backscattered light from droplets. The backscattered light 102 may first pass through an optically transparent window (not shown), and then the receiver optic which may include a collimating lens 106 followed by a focusing lens 108. A portion of the focused backscattered light 110 impinges on the conical inner reflective surface 112 of a conical reflector 114 which acts as a circle-to-line converter (CLC) and reflects the focused backscattered light 110 onto a planar detector 120 which is positioned in the focal plane and in one embodiment comprises a linear array of detector elements.

Right-Angle Circle-to-Line Converter

Figure 9:
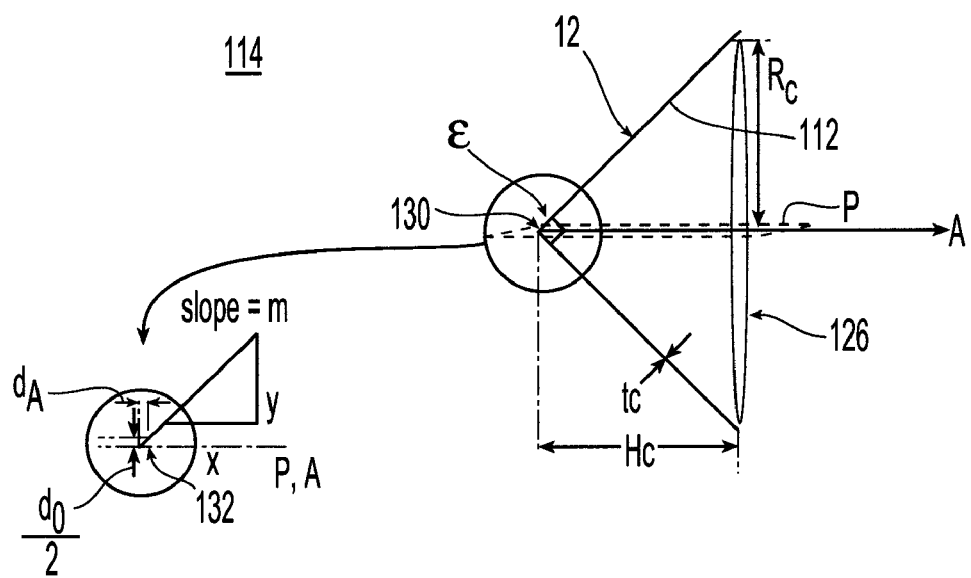
FIG. 9 shows a conical reflector in accordance with one embodiment of the present invention.

FIG. 9 shows one embodiment of a CLC 114 of the sort that may be employed in system 100. It is understood that for purposes of explanation, the CLC of FIG. 9 is depicted as a complete cone which is symmetric about a focal plane P containing cone axis A. Thus, a CLC may be formed as a complete cone and then sliced into two along the focal plane P, assuming minimal material loss, such as 0.1 mm in thickness.

The CLC 114 has a base 126 with a cone radius $R_c$, a conical wall 126 having a predetermined wall thickness $t_c$, a cone height $H_c$ and an apex 130. In one embodiment, the cone radius $R_c$ is 25.4 mm, the wall thickness $t_c$ C is 5 mm and the cone height $H_c$ is 25.4 mm. The apex 130 is provided with apex angle $\epsilon$. In one embodiment, apex angle $\epsilon$ is a right angle with limited tolerance, such as $\epsilon=90°\pm0.5°$, thus giving a cone angle of 45°. The reflective surface 112 has a constant slope m along the cone axis A; since the cone angle is 45°, the slope m=1.

The reflective surface 112 is highly reflective (e.g., >95% or even >98% at a wavelength of interest, such as 1550 nm and a 45° angle of incidence). Furthermore the surface figure (60/40 or better) ensures good optical quality at visible and near-infrared wavelengths. Several possible methods of producing the cone are wire EDM of a metal substrate, electroforming a metal cone over a precision-machined mandrel, and diamond turning of a metal (preferably aluminum) substrate. After the cone has been fabricated, it is coated with a suitable reflective surface, such as protected aluminum or gold.

In some embodiments, in the proximity of the apex 130 is an optically transparent aperture 132 which extends from the apex 130 along the cone axis A for a length $d_A$. In a CLC 114 having an apex angle of about 90°, the diameter do of the optically transparent aperture 132 is roughly 2 $d_A$. The optically transparent region 132 is devoid of reflective material and thus allows light entering the CLC 114 along cone axis A to pass through the apex 130, rather than being reflected towards the focal plane. In some embodiments, the optically transparent aperture 132 has a length dimension $d_A$ along the cone axis A of about 0.05 mm.

Figure 1:
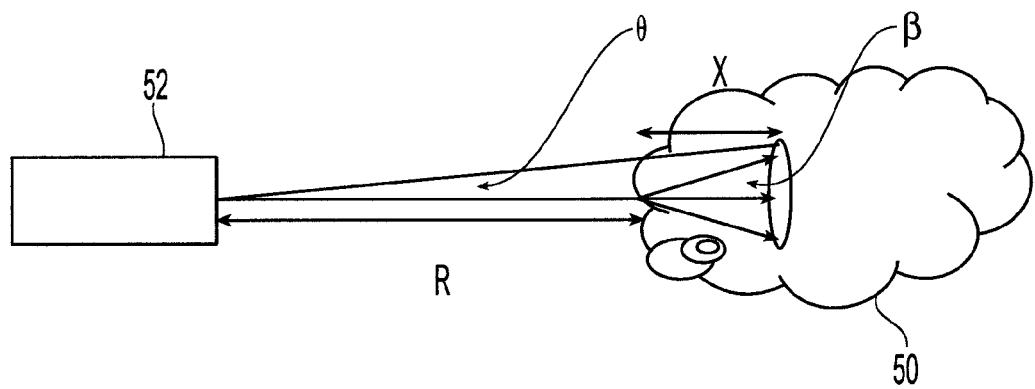
FIG. 1 shows the geometry of multiple scattering in a cloud.
Figure 2:
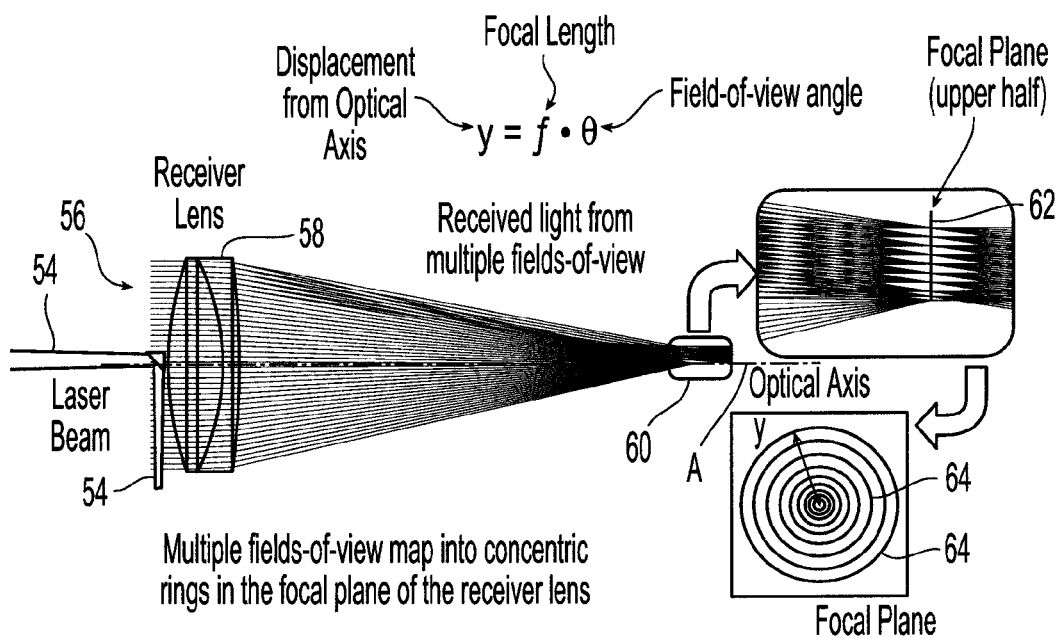
FIG. 2 shows how the multiple fields-of-view generated by droplets map onto a plurality of concentric rings in the focal plane.
Figure 3:
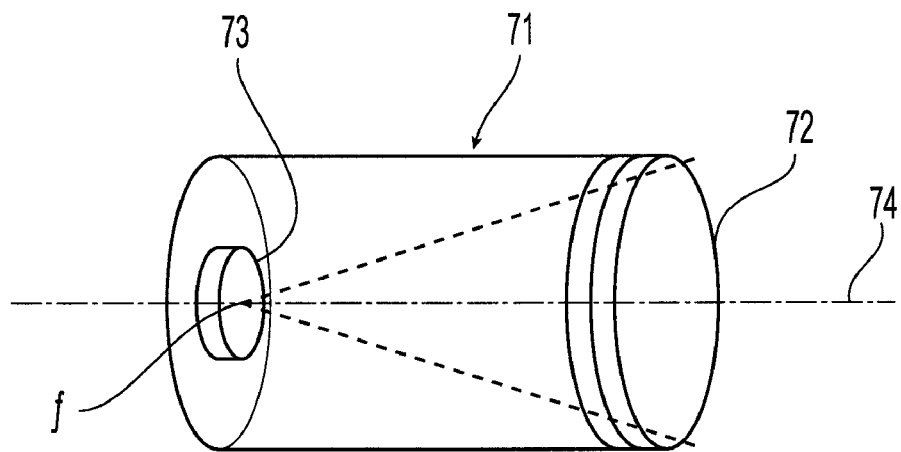
FIG. 3 shows a transparent side view of a prior art multiple field of view detector for detecting atmospheric backscatter, as disclosed in U.S. Pat. No. 5,239,352.
Figure 4:
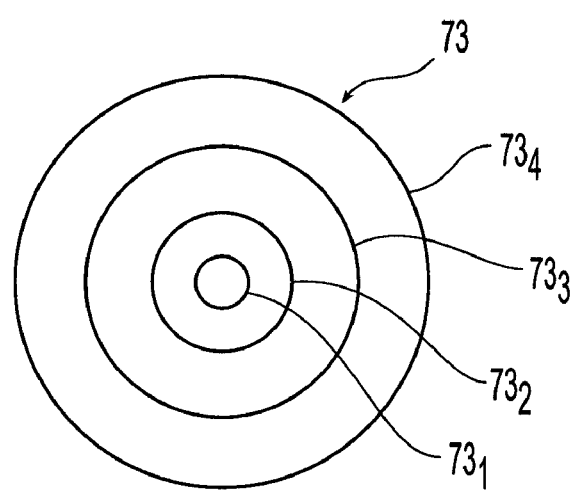
FIG. 4 shows the focal plane of the prior art detector of FIG. 3 showing concentric detector elements.
Figure 5:
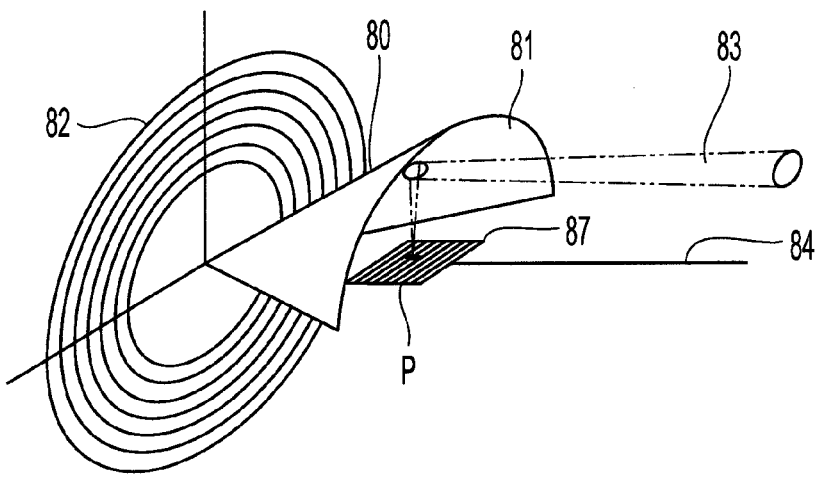
FIG. 5 shows a prior art conical circle-to-line interferometer detector, as disclosed in U.S. Pat. No. 4,893,003.
Figure 6:
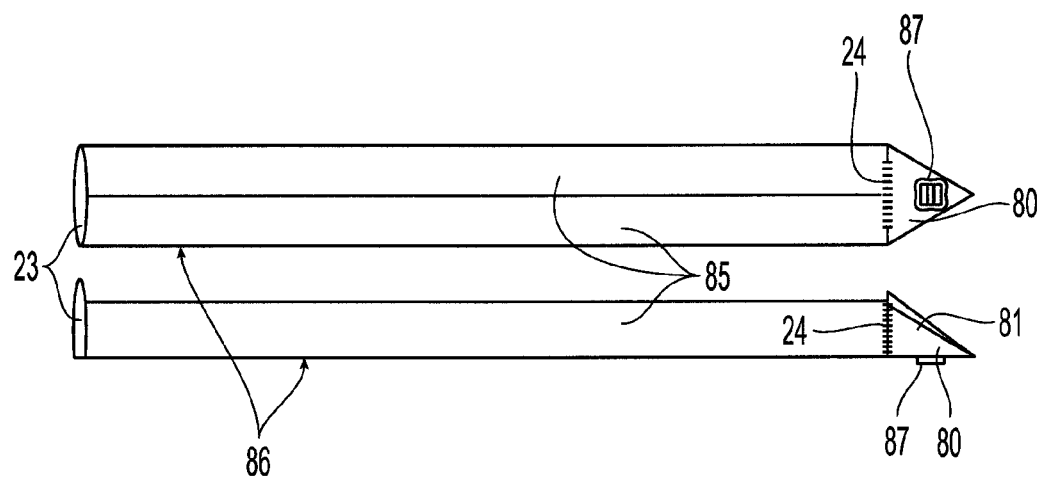
FIG. 6 shows a kaleidoscopic mirror assembly in combination with the detector of FIG. 5.
Figure 7:
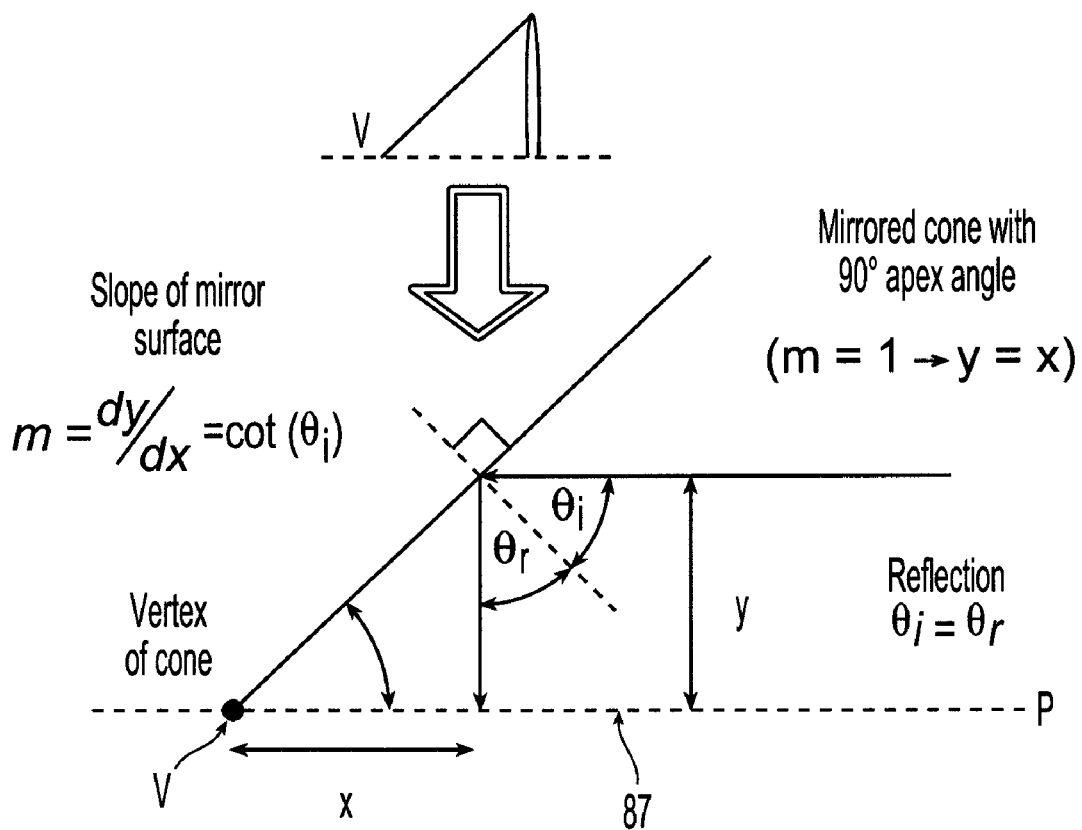
FIG. 7 shows the mapping of an incoming interferometric fringe pattern onto the detector of FIG. 5.

The circular rings (see FIG. 2) which are converted into lines detected by detector 120 are created from the scattering of light within the cloud or fog medium. The wavelength of the light, the droplet size distribution, and the droplet density affect the radial spread of the light entering the CLC 114.

Table 1 shows the location of the lines produced by the various fields of view with respect to the cone apex 132. The fields of view were originally specified in quarter fractions of a degree and later converted to mrad, which accounts for the non-integral specifications in mrad. A linear array sensor 120 having a length L=5 mm is sufficient to capture the entire range of FOVs for the CLC 114. However, the resolution required at the small FOVs (i.e., close to the apex 130) can be challenging since supercooled large droplets are likely to produce FOVs less than 5 mrad, which are all contained within the first 0.75 mm from the cone apex. If one is unwilling to remove the protective optical window over the linear array sensor 120 and expose the detector elements to possible contamination, then options such as relay imaging of the focal plane or the use a bundled fiber image transfer device may be suitable alternatives.

TABLE 1

| FOV versus Displacement from Apex of CLC | |
|---|---|
| FOV (mrad) | Displacement from Apex (mm) |
| 0.5 | 0.06 |
| 1.1 | 0.13 |
| 2.2 | 0.26 |
| 4.4 | 0.53 |
| 8.8 | 1.06 |
| 13.1 | 1.58 |
| 17.4 | 2.09 |
| 21.8 | 2.62 |
| 26.2 | 3.15 |
| 30.5 | 3.67 |
| 34.9 | 4.20 |

Figure 10:
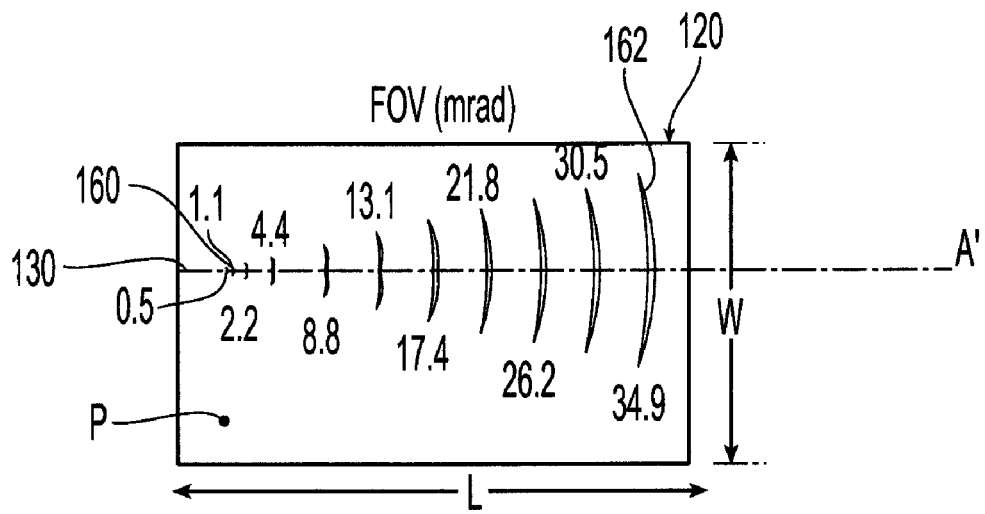
FIG. 10 shows the full MFOV ray trace pattern for the conical reflector of FIG. 9.

FIG. 10 presents a simulation of a ray trace using a f/2.4 receiver optic for CLC 114. The ray trace comprises the FOV lines of Table 1 superimposed on a detector 120 having a longitudinal detector axis A', length L, and width W. A detector 120 of length L=5 mm long comprising a linear array of detector elements is sufficient to capture the FOVs of interest given the specified parameters for the CLC 114 of FIG. 9. To collect as much light as possible at the largest FOV, the detector elements should be at least w=2 mm wide (i.e., the "width" being take in a direction perpendicular to the detector axis A' and far exceeding the "length", which is taken along the detector axis A'). As seen in FIG. 10, detector 120 samples light very near the apex 130 of the CLC 114 to detect the presence of large droplets. In one embodiment, the detector elements of the detector 120 approach the apex to within 60 μm, both in the dimension along the cone axis and toward the cone surface along a dimension perpendicular to the cone axis.

In addition to the spacing of the lines, especially near the apex 130, there is also the issue of thickness and curvature, both of which affect resolution. The FOV lines produced by the CLC 114, such as line 160 for an FOV of 1.1 mrad and line 162 for an FOV of 34.9, have finite thickness along the detector axis A' as superimposed on the focal plane P, and this thickness limits the minimum pixel size required of the detector elements of the detector 120. The FOV lines 160, 162 also show a slight amount of curvature, and this curvature is the limitation of the angular resolution of detector 120.

Figure 11:
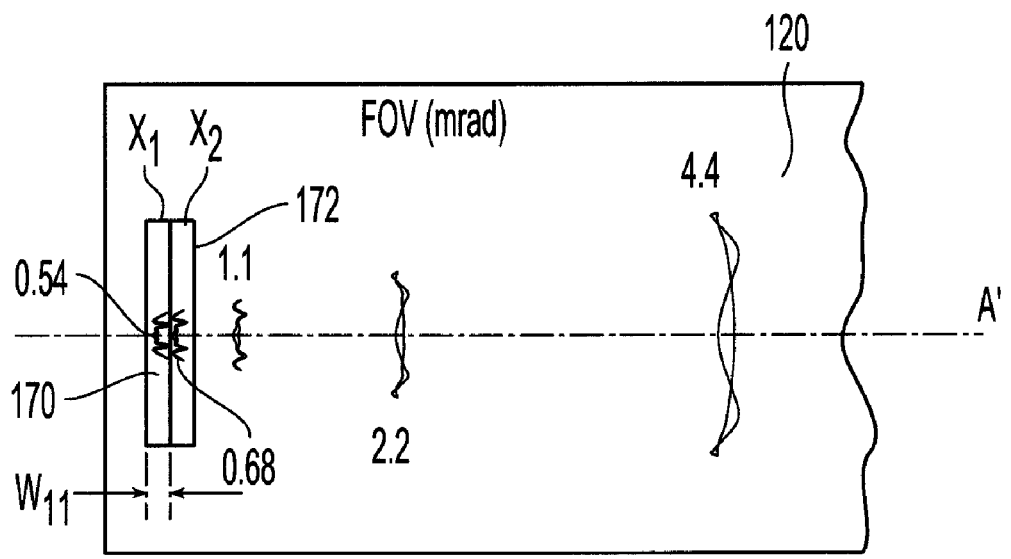
FIG. 11 shows detector pixels for small angle MFOVs for the conical reflector of FIG. 9.

FIG. 11 illustrates the line-width-limited resolution at small FOVs of 0.54 mrad 170 and 0.68 mrad 172 detected by adjacent pixels x1 and x2, each having a pixel length $w_{11}$ along the detector axis A'. The 0.14 mrad separation between the two FOVs translates into a linear spacing of about 20 μm. So long as the pixel length $w_{11}$ is smaller than a spacing of 20 μm, the light detected from one FOV at one pixel will not bleed into the light detected from the other FOV. Thus, if $w_{11}$=20 μm were the pixel length for pixels of the linear array comprising detector 120, it would be possible to unambiguously collect light from these two distinct FOVs 170, 172. To accommodate the entire spectrum of FOVs (5 mm's worth) with a pixel width of $w_{11}$=20 μm, the detector 120 would require a linear array of approximately 250 pixels.

Figure 12:
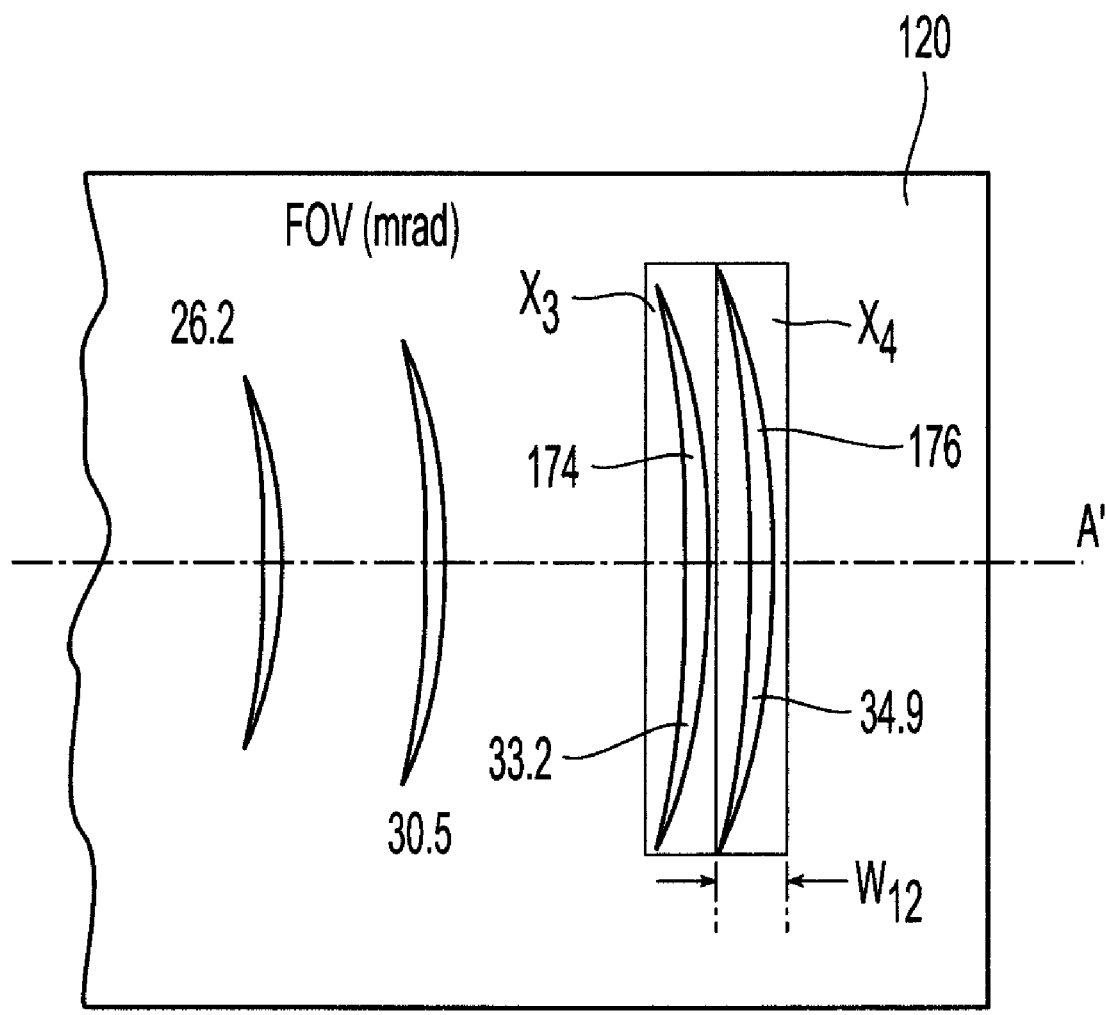
FIG. 12 shows detector pixels for large angle MFOVs for the conical reflector of FIG. 9.

At large FOVs, the line curvature degrades the resolution more. FIG. 12 illustrates the line-width-limited resolution at larges FOV of 33.2 mrad 174 and 34.9 mrad 176 detected by adjacent pixels x3 and x4, each having a pixel length $w_{12}$ along the detector axis A'. The 1.7 mrad separation between the two FOVs translates into a linear spacing of about 204 μm. So long as the pixel length $w_{12}$ is smaller than the spacing of 204 μm, the light detected from one FOV at one pixel will not bleed into the light detected from the other FOV. Thus, if $w_{12}$=204 μm were the pixel length for pixels of the linear array comprising detector 120, it would be possible to unambiguously collect light from these two distinct FOVs 174, 176.

Linear arrays for imaging are available with pixel widths of 25 μm to 30 μm, so it is possible to take advantage of the system's intrinsic angular resolution at small fields-of-view. Two examples are the Hamamatsu S3902/S3903 (which is a silicon sensor appropriate for wavelengths from 300 to 1100 nm) and the SUI Linear Photodiode Array (which is an InGaAs sensor appropriate for wavelengths from 900 nm to 1800 nm). The small size and subsequent increased number of individual detector elements enables one to tune the width and distribution of the detected fields-of-view through software by binning the signals appropriately. For example, if a particular FOV span covers two adjacent detector elements, the span can be doubled simply by modifying the control software to add the signals from four adjacent elements. The greater the number of detector elements, the greater is the flexibility in selecting the positions and widths of the fields-of-view that enter into the computation of the particle size distribution. As discussed below such an off-the-shelf linear array may be used in conjunction with other optical elements. It is also understood that the term "linear array" may refer to a one-dimensional array of pixels, as well as to a 2-dimensional array of pixels in which the pixels along one direction (either 'row' or 'column') are electrically ganged together so that the device effectively functions as a one-dimensional array.

Tapered Circle-to-Line Converter

Figure 13:
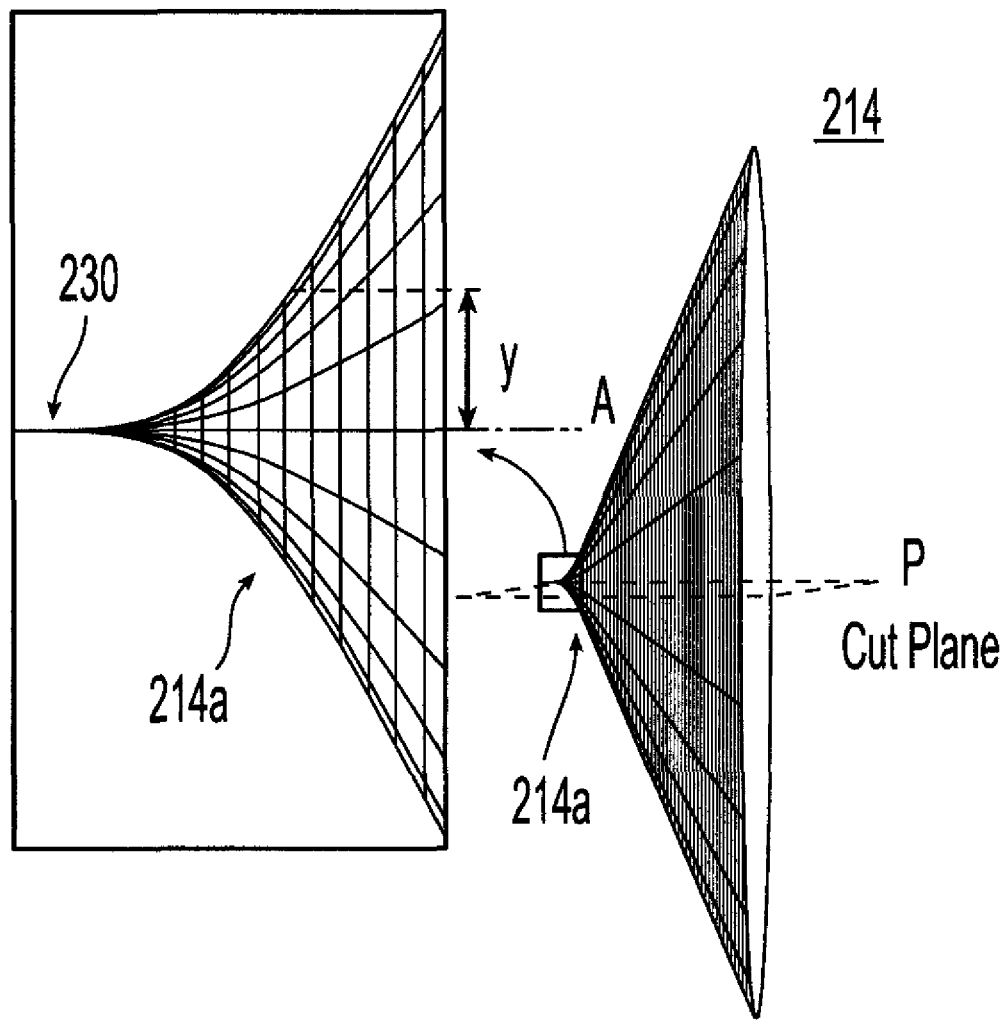
FIG. 13 shows the apex region of a tapered conical reflector in accordance with one embodiment of the present invention.

FIG. 13 shows a profile of a tapered CLC 214 in accordance with another embodiment of the present invention. The tapered area 214a is present principally in the vicinity of the apex 230, where the slope of the internal tapered reflective surface 212 is under 1.0.

Figure 14:
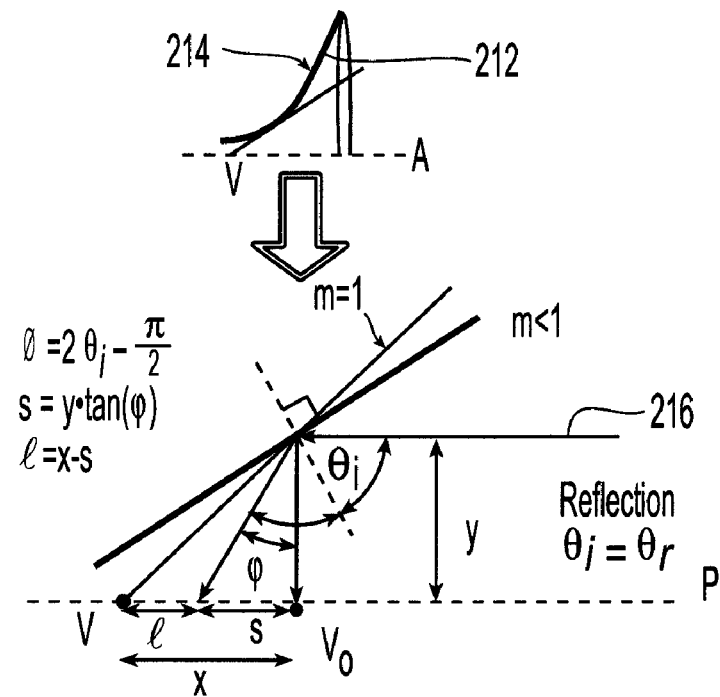
FIG. 14 shows a lateral cross-section for the tapered conical reflector of FIG. 13.
Figure 15:
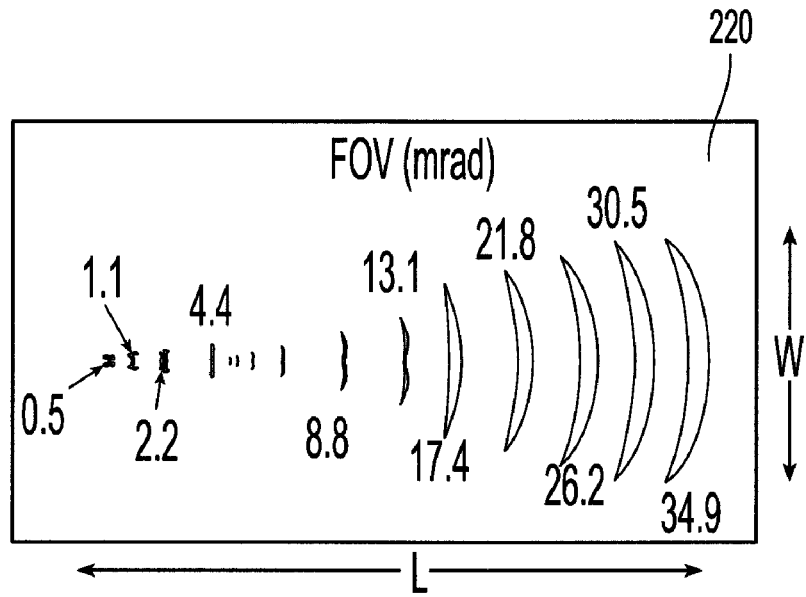
FIG. 15 shows the full MFOV ray trace pattern for the tapered conical reflector of FIG. 13.

FIG. 14 shows a lateral cross-section of the tapered CLC 214. The tapered CLC 214 has an internal tapered reflective surface 212 which has a varying slope m along the cone axis A. More particularly, in the tapered CLC 214, the instantaneous slope m<1 is close to the conical axis A. If the instantaneous slope m of the tapered reflective surface 212 deviates from one, the reflected ray strikes the image plane at a distance l from the point V. A slope of m<1 causes the reflected spot to move towards the left, while a slope of m>1 moves the spot toward the right. Thus, the tapered CLC 214 alters the instantaneous slope of the mirrored surface so that the reflected spot lies at distance l from the point V according to some prescribed function l(y).

The distance l(y) is expressed in terms of the instantaneous slope m as:

$$\lambda(y) = x - s \quad (4)$$
$$= y - y\tan(\varphi)$$
$$= y \cdot (1 - \tan(2 \cdot \theta i - \pi/2))$$

$$\lambda(y) = y \cdot (1 - \tan(2 \cdot \cot^{-1}(m) - \pi/2))$$

where:

$\theta_i$ is the angle at which the incoming focused ray 216 strikes the internal tapered reflective surface 204, $\theta_r$ is the reflection angle; y is the radius (height) of the incoming focused ray 216; x is the distance from the point V to a point $V_0$ on the focal plane P to which the ray 216 is reflected assuming that the instantaneous slope of the internal tapered reflective surface 212 is m=1 ($V_0$ being directly below where the ray 216 strikes the internal tapered reflective surface 212); s is the difference between x and l; and $\phi=2\theta_i-\pi/2$.

A right-angle CLC 114, such as seen in FIG. 9, is the limiting case of the tapered CLC 214. For a simple conical CLC with m=1, the function is l(y)=y. In the case of water droplet sizing, it is desirable to have this function take another form so that information about large droplets is not compressed into a small spatial range that the linear array is unable to resolve, even though altering the instantaneous slope m may compromise the ability of the reflector to produce a sharp focus in the image plane. A slope of m=1 insures that the image plane of the lens maps one-for-one onto the image plane of the CLC, where the linear array is positioned. Any other slope may defocus the image and reduce the resolution, and so keeping the defocus to a tolerable level is desirable.

By tapering the slope of the CLC as a function of y (which is directly proportional to the FOV angle θ), it is possible to obtain logarithmic spacing on the linear array detector. The prescribed function is l(y)=A ln (y), where A is some constant dependent on the detector attributes among other things. Through substitution of l(y)=A ln (y) into equation (4) above, the solution of the instantaneous slope m as a function of y for the tapered CLC 214 is:

$$m(y) = \cot\left(1/2\left(\tan^{-1}\left(1 - \frac{A\ln(y)}{y}\right) + \pi/2\right)\right). \quad (5)$$

The constant A dictates the particular FOV for which the slope of the tapered CLC is equal to one. It is for this FOV that the image distortion will be the least since the tapered cone will best mimic the right-angle reflective cone, which maps the image plane of the collector lens directly onto the linear array detector. This FOV may be small or large, depending on the region of interest and the tolerance for distortion that inevitably occurs when the slope deviates from one. In the present case, the goal is to size accurately large diameter (>40 μm) droplets, so the linear region of the tapered cone is selected to lie around 10 mrad, or (from Table 1 above) y ~1.5 mm. The constant A is then equal to 1.5 mm/ln (1.5) or, in general, $$A = \frac{f\Theta}{\ln(f\Theta)} \quad (6)$$

where f is the focal length of the receiver optic, and θ is the FOV where the highest imaging fidelity is required.

FIG. 14 shows a simulation of a ray trace of the lines produced by the tapered CLC 214 for the same f/2.4 receiver optic in the simulation with the CLC 114. The lines occupy the same space as those generated by the CLC 114. Table 2 below compares the physical spacing between three distinct FOVs relative to a minimum FOV of 0.54 mrad for the CLC 114 and the tapered CLC 214.

TABLE 2

Relative linear displacement of FOVs with respect to 0.54 mrad FOV

| FOV (mrad) | Standard CLC Displacement (mm) | Modified CLC Displacement (mm) |
|---|---|---|
| 0.54 | — | — |
| 1.1 | 0.07 | 0.20 |
| 2.2 | 0.13 | 0.40 |
| 4.4 | 0.47 | 0.85 |

As seen in Table 2, for fields-of-view less than 5 mrad (i.e., large droplets), the spacing increases for the tapered CLC. However, the distortion (spreading) of each FOV may be greater. Thus, while a spacing of only 20 μm was required to separate 0.54 mrad from 0.68 mrad in the CLC 114, a spacing of 50 μm or so may be required to separate 0.54 mrad from 0.68 mrad in the tapered CLC 214.

Image Transfer with Fiber Optic Plate

Figure 16:
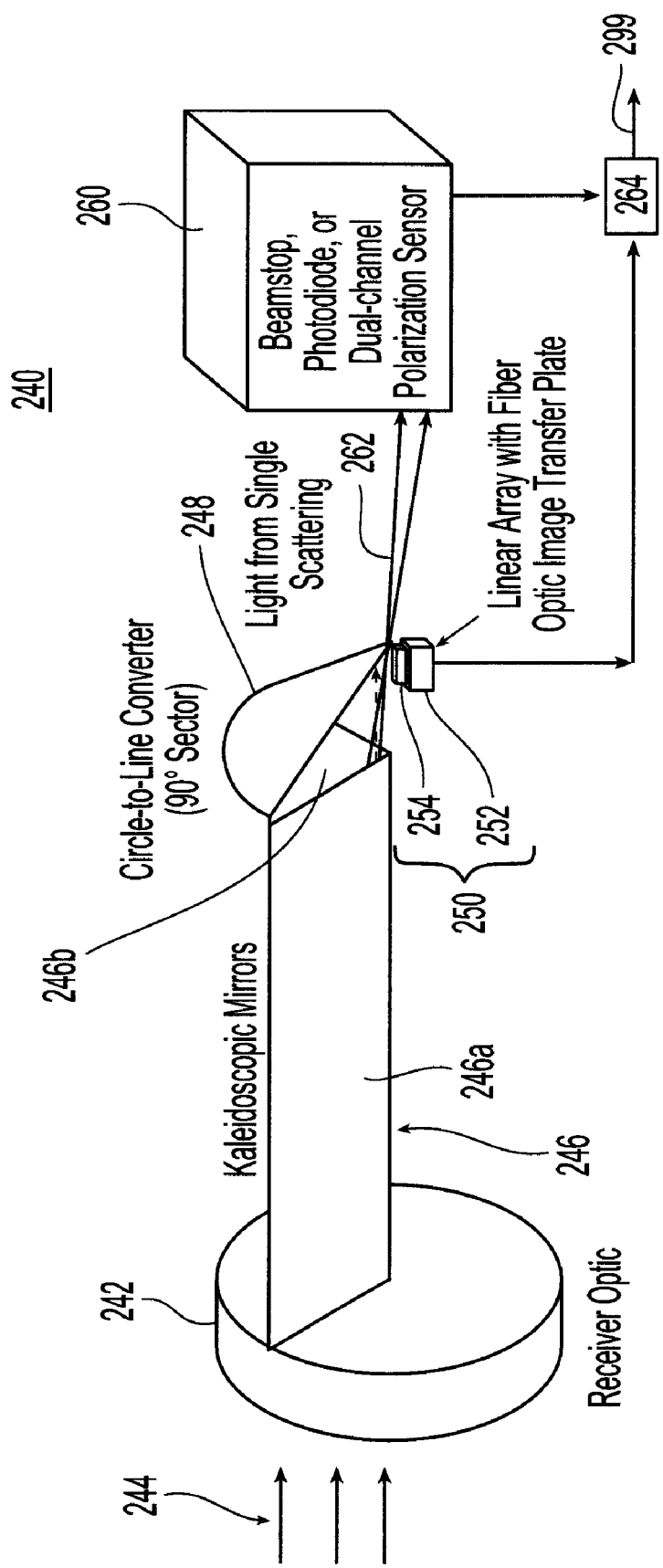
FIG. 16 shows one embodiment of an MFOV detector assembly in accordance with the present invention.

FIG. 16 shows one embodiment of an MFOV detector assembly 240 in accordance with the present invention. The MFOV detector assembly 240 includes a receiver optic 242 for receiving the incoming backscattered light 244, a kaleidoscope 246 for guiding the focused backscattered light after it emerges from the receiver optic 242, and a CLC 248 for reflecting the channeled and focused backscattered light in the direction of a MFOV subsystem 250 for capturing the reflected image. In this embodiment, the MFOV subsystem 250 comprises a detector 252 over which a fiber optic image transfer plate 254 is positioned. A single FOV subsystem 260 captures light from single scattering 262, and may include a simple beamstop, one or more photodiodes, or a dual channel polarization sensor, as discussed below.

The output of the MFOV subsystem 250 and the single FOV subsystem 260 are supplied to circuitry 264 for calculating one or more parameters which are reflective of the presence of one or more of supercooled water droplets, ice and other environmental and/or weather conditions. In one embodiment, the circuitry 264 may comprise an application-specific integrated circuit or a processor. In another embodiment, the circuitry 264 may comprise discrete logic circuits such as comparators, adders, and the like. It is further understood that analog-to-digital converters and the like may also be included, if not already incorporated into the circuitry 264. In some embodiments, the one or more parameters may comprise a ratio of the outputs. In other embodiments, the one or more parameters may comprise a comparison of the outputs. Other, more complicated, parameters are also possible. After calculating any such parameters, the circuitry 264 may output one or more signals 299 to indicate the decision, signal an alarm, or the like.

It is understood that the outputs of the two subsystems 250, 260 are provided to a processor subsystem (not shown in FIG. 16) configured to determine water droplet size distribution and other parameters which may be used to take or suggest certain actions.

To separate the light rays due to single scattering from those due to multiple scattering, the apex of the CLC 248 is removed (such as by diamond turning or a wire EDM) so that the CLC 248 has the shape of a frustum of a cone. The effective diameter D at the small end of the frustum is given by f·Δθ, where f is the focal length of the receiver optic, and Δθ is the far-field divergence of the transmitted laser beam. By replacing the apex of the cone with an optical hole, the received light from single scattering does not get reflected into the detector 252, thereby reducing random scatter of this light. In such an embodiment, the CLC 248 is configured to separate the multiply scattered light received from a cloud from that due to single scattering. The divergence of the illuminating signal may restrict the utility of the CLC 248 to perform this separation since multiple scattering from extremely large droplets will still lie within the divergence angle of the laser beam, resulting in the single scattering and multiple scattering becoming mixed together.

If the detector 252 has sufficiently high bandwidth to generate range-resolved intensity profiles through the cloud, a simple beamstop can extinguish the single scattering and prevent it from leaking into the detector 252. However, in the case of a detector comprising a linear CCD array for which the frame rate is too slow, a high-speed photodiode placed behind the CLC 248 can monitor the reduction in the single scattering signal as it passes through the cloud. This intensity profile as a function of range can yield information about the extinction coefficient of the cloud and, in combination with the droplet size distribution obtained from the MFOV data, an estimate of liquid water content.

In one embodiment, the CLC 248 covers only a 90° azimuthal extent. While the CLCs 114, 214 are illustrated as having a full 180° azimuthal extent, most optical detectors do not have an acceptance angle beyond 45°. Hence, a 90° azimuth section, or quarter sector, of a CLC may be all that is available for a detector 252. The kaleidoscope 246, which comprises a pair of flat kaleidoscopic mirrors 246a, 246b arranged at right angles to each other, converts the light that would otherwise fall on a complete circle in the focal plane into a smaller angular segment which matches the reduced azimuthal extent (e.g., 90°) of the CLC 248. From the perspective of the detector 252, the concentric fields of view appear over an azimuth span of 360°, 90° directly from the receiver optic 242 and the other 270° from the reflections in the kaleidoscope mirrors 246a, 246b. Thus, a full 360° azimuth field-of-view of the receiver optic 242 is folded into a 90° azimuth span that can be accepted by the CLC 248 and reflected to the detector 252.

The fiber optic image transfer plate 254, which may be implemented using Hamamatsu part no. J5734, is used to transfer an image without using a lens. The plate 254 includes of a large number of optical fibers bundled together. The fibers within the plate have a small diameter (typically 3 μm) and accept light over an acceptance angle of nearly 90°. The surface of the plate 254 is positioned to lie in the focal plane of the CLC 248 so that the image is transferred directly to the detector 252 beneath the plate 254.

Image Transfer with Lens Relay

Figure 17:
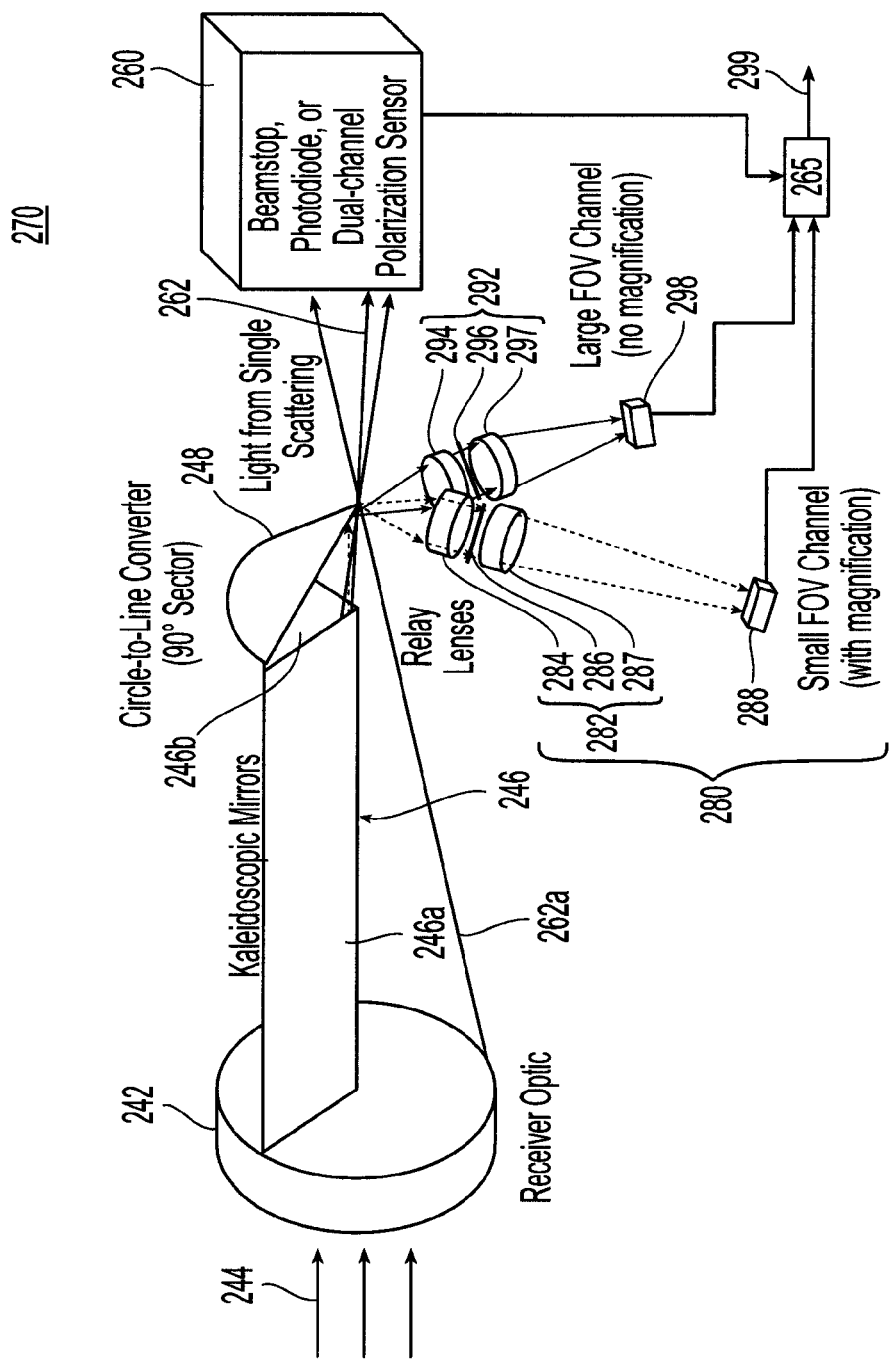
FIG. 17 shows another embodiment of an MFOV detector assembly in accordance with the present invention.

FIG. 17 shows another embodiment of an MFOV detector assembly 270 in accordance with the present invention. The MFOV detector assembly 270 includes many of the same components as MFOV detector assembly 240 of FIG. 16, including the receiver optic 242, kaleidoscope 246, CLC 248 and a single FOV subsystem 260. However, MFOV detector assembly 270 has an MFOV subsystem 280 which differs from MFOV subsystem 250 found in MFOV detector assembly 240.

MFOV subsystem 280 uses a plurality of sets 282, 292 of optical elements which are positioned below the focal plane of the CLC 248. In one embodiment, a first set 282 of optical elements amplifies small FOV reflections from the CLC 248 which are then received by a first detector 288, while a second set 292 of optical elements amplifies large FOV reflections from the CLC 248 onto a second detector 298.

The first set 282 of optical elements may include a collimating lens 284 through which the reflect light first passes, a bandpass filter 286 to mitigate ambient light, such as daylight, and a magnifying lens 287 to amplify the reflected optical signal before it is captured by the first detector 288. The second set 282 of optical elements may likewise include a collimating lens 294, a bandpass filter 296 and a focusing lens 297.

Magnification is especially useful for imaging scattering at small angles, where most of the information about large droplet density is contained. Each lens 284, 294 collects some fraction of the diverging light rays past the CLC's 248 focal plane, and collimates them. The first focusing lens 287 for the small FOV reflections (from large droplets) may be configured to magnify the reflected signal to a larger degree than the second focusing lens 297 for the large FOV reflections, since the latter may already be of suitable size for detection. In some embodiments, the second focusing lens 297 may be omitted entirely since the ray lines corresponding to large FOV reflections may be of sufficient size and spacing.

Since the MFOV detector assembly 270 will be used in sunlight, the bandpass filter 286, 296 may be configured to exclude as much ambient light as possible while still allowing the backscattered light, created in response to an incident light of known wavelength, to pass. In some embodiments, the bandpass filters 286, 296 use thin film coatings designed to work best for collimated light. Such filters are familiar to those of ordinary skill in the art. Also, due to the collimating effect of lenses 284, 294, the spacing between collimating lenses 284, 294 and focusing lenses 287, 297 is not critical, and can be adjusted to allow the insertion of more than one bandpass filters.

Also, the geometry of the MFOV detector assembly 270 is configured to allow the single scattering rays to be collected over the full aperture of the receiver optic 242. As exemplified by ray 262a, virtually none of the single scattering rays collected by the receiver optic 242 is blocked either by the sets 282, 292 of optical elements or by the detectors 288, 298, and so virtually all of the single scattering from across the receiver optic 242 enters the single FOV subsystem 260, e.g., the photodiode or the dual-channel polarization sensor.

The output of the MFOV subsystem 280 and the single FOV subsystem 260 are supplied to circuitry 265 for calculating one or more parameters which are reflective of the presence of one or more of supercooled water droplets, ice and other weather conditions. In one embodiment, the circuitry 265 may comprise an application-specific integrated circuit or a processor. In another embodiment, the circuitry 264 may comprise discrete logic circuits such as comparators, adders, and the like. It is further understood that analog-to-digital converters and the like may also be included, if not already incorporated into the circuitry 265. In some embodiments, the one or more parameters may comprise a ratio of the outputs. In other embodiments, the one or more parameters may comprise a comparison of the outputs. In still other embodiments, the spatial distribution of the intensity of light received on the detectors 288, 298 may be compared against reference data to make decisions as to the current weather conditions. Other, more complicated, parameters are also possible. After calculating any such parameters, the circuitry 265 may output one or more signals 299 to indicate the decision, signal an alarm, or the like.

Dual Channel Circular Polarization Sensor

In general, direct reflections of an illuminating light, such as laser light, from spherical water droplets are purely specular while those from ice crystals are not.

Water droplets ideally act like perfect mirrors and scatter the reflected laser light back on itself without altering the polarization state. If the incident light is horizontally or vertically polarized, the reflected light is likewise horizontally or vertically polarized. Therefore, a backscatter polarization with a relatively low degree of depolarization is indicative of a liquid water cloud. In the case of circular polarization, the direction of the rotating electric field does not change upon reflection, but the change in Poynting vector of the incident wave changes the sense of circular polarization. Hence, an incident beam which is right hand circularly polarized becomes left hand circularly polarized upon reflection, and vice versa.

Ice crystals, on the other hand, tend to alter the polarization state of reflected light, due in part to multiple internal reflections from their facets and in part to the birefringence of ice. Reflected light from airborne ice crystals becomes a mixture of two orthogonal polarization states when the incident light is a pure polarization state. By monitoring both orthogonal polarization states of the backscattered light, it is possible to distinguish water droplets from ice crystals.

However, in a cloud, in addition to direct backscatter, the light undergoes significant small-angle forward scattering whenever the ratio of water droplet size to laser wavelength is near or slight greater than one. This process is known as Mie scattering. In most clouds, the water droplets range from 1 to 10 microns, while typical visible and near-infrared wavelengths range from 0.4 to 2.0 microns. Airborne water droplets produce Mie scattering for visible and near-infrared optical sensors. The forward-scattered light may eventually scatter back towards the optical receiver that is coincident with the projected laser beam. When it does, its polarization state will be altered beyond what it would have been if the light had reflected from a water droplet directly, without experiencing forward-scattering. This series of forward scattering events accompanied by a single backscatter is known as multiple scattering, and it produces a de-polarized signal that is quite unlike the signal produced by single scattering event from a spherical water droplet.

Circular polarization may be used in an airborne water droplet and ice crystal sensor to help distinguish between a water cloud and an ice cloud If a cloud is composed of water droplets, the basic "sense" of circular polarization does not change, regardless of the presence of multiple scattering. If the illuminating beam is right hand circularly polarized ("RHC"), the backscattered light from a pure water cloud will have only a left hand circularly polarized ("LHC") component. Multiple scattering will degrade the polarization purity of this light by introducing a linear component that makes the light elliptically polarized. But when the light is decomposed into its Stokes components, the circular component still will be left hand circularly polarized, never right circularly polarized, as long as the cloud is completely composed of liquid water droplets.

If the cloud is completely composed of ice crystals, the circular component of the Stokes vector will be right hand circularly polarized, regardless of the presence of other linear components that are introduced by multiple scattering or by birefringence of the ice crystals. Hence, if the fourth component of the Stokes vector is monitored, the presence of a pure ice crystal cloud will show a distinct, unambiguous "flip" in the direction, or sense, of circular polarization.

Figure 18:
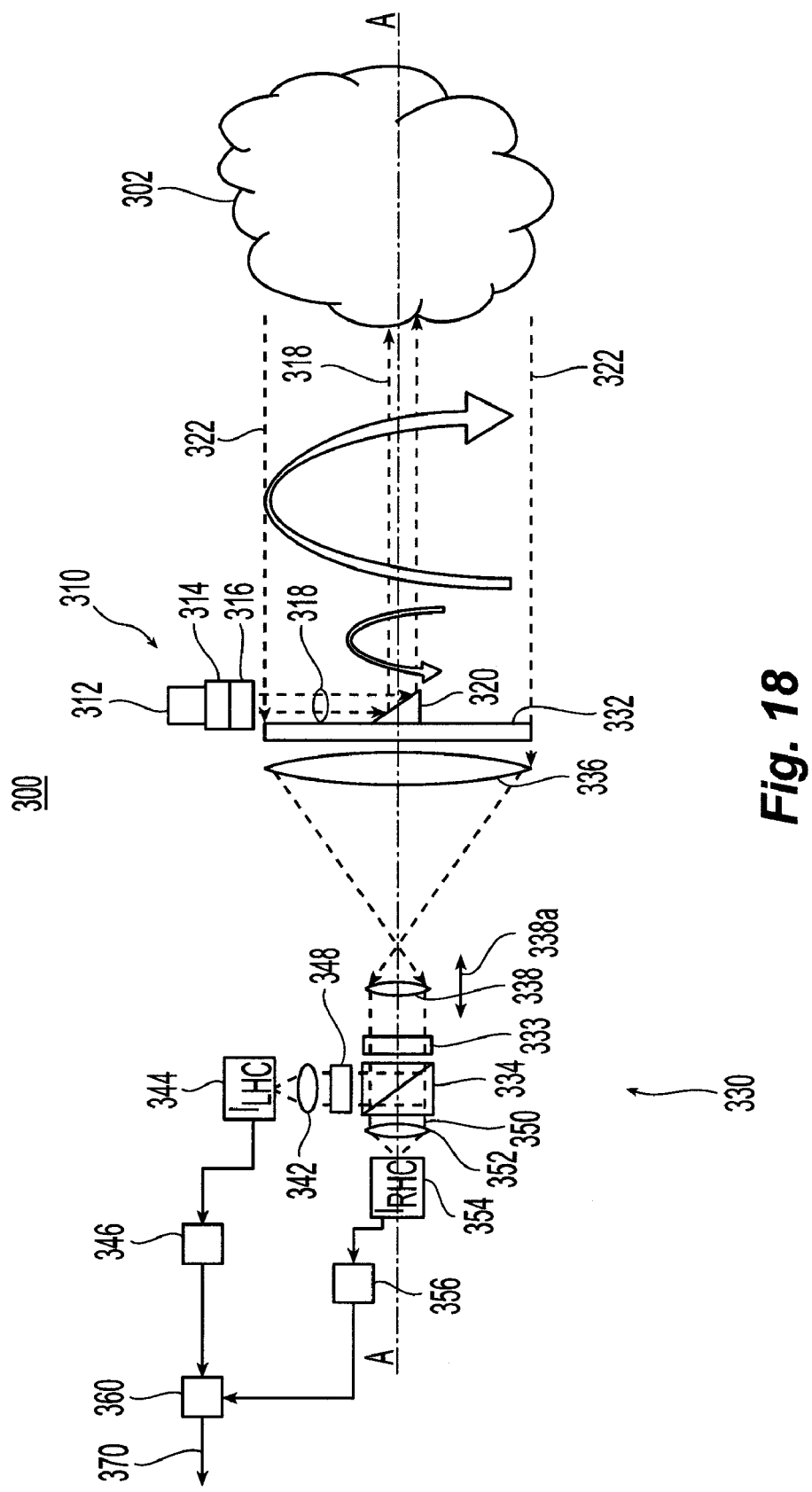
FIG. 18 shows a schematic of a dual channel circular polarization sensor for the detection of airborne moisture.

FIG. 18 shows a schematic of a dual channel circular polarization system 300 which employs circularly polarized light to distinguish between water and ice crystals. The system 300 includes two linear polarizers 314, 348 and two circular polarizing elements 316, 333 in the form of two quarter wave plates, whose function is described below. System 300 includes an illumination portion 310 and a detection portion 330.

The illumination portion 310 includes an optical beam emitter 312 which outputs a first light beam. The optical beam emitter 312 may comprise a laser or, alternatively, a light emitting diode whose output is linearly polarized. An illumination-side linear polarizer 314 helps ensure high polarization purity by receiving the first light beam (which may already be linearly polarized) from the optical beam emitter 312 and outputting a linearly polarized illuminating beam. In one implementation, the illumination-side linear polarizer 314 is model number DP-050-NIR2-2, available from Meadowlark Optics, of Frederick, Colo. (USA).

In some embodiments, the linearly polarized illuminating beam is first reflected by an illumination-side polarizing beam splitter cube 315 (See FIG. 19) before being presented to a first circular polarization element 316. In one implementation, the illumination-side polarizing beam splitter cube 315 is model number BB-050-IR2, available from Meadowlark Optics, of Frederick, Colo. (USA).

The first circular polarization element 316 receives the linearly polarized illuminating beam and transforms it into a circularly polarized illuminating beam 318. In one embodiment, the circular polarization element 316 comprises a quarter wave plate which transforms the linearly polarized light into circularly polarized light. In one implementation, the quarter wave plate 316 is model number CP-050-905, available from Meadowlark Optics, of Frederick, Colo. (USA).

In the embodiment shown, the illumination portion 310 also includes a reflector 320 configured to reflect the circularly polarized illuminating beam 318 along an optical illumination axis A of the system 300 and in the direction of a cloud 302. The reflector 320 must not alter the circular polarization. In one embodiment, the reflector comprises a standard protected gold mirror which, in one prototype, produced a circular polarization purity of better than 400:1.

While the system 300 is shown as directing the circularly polarized illuminating beam 318 in the direction of a cloud 302, it is understood that during use the system 300 is mounted on an aircraft which may be passing through a cloud. Also, it is noted here that the system 300 typically is configured to detect cloud ice at a range of 10 to 20 meters. As is known to those of ordinary skill in the art, the range is determined by the duration and timing of pulses applied to the optical beam emitter 312, and the timing associated with the detection portion 330.

The circularly polarized illuminating beam 318 illuminates a volume of space in the cloud 302. In response, moisture within that instantaneous volume of space in the cloud 302 causes backscattering of the circularly polarized illuminating beam 318, thereby creating circularly polarized backscattered light 322 which travels in the direction of the system 300.

The detection portion 330 of the system 300 includes a window 332 configured to permit the circularly polarized backscattered light 322 to pass therethrough. In the embodiment shown, the circularly polarized backscattered light 322 first passes through the window 332 and towards a second circular polarization element 333, which may also be a quarter wave plate.

The second circular polarization element 333 receives the circularly polarized backscattered light that has passed through the window 332 and outputs linearly polarized backscattered light. Before reaching the second circular polarization element 333, the backscattered light 322 passes through a first lens 336 for focusing the backscattered light 322 and a collimating lens 338.

In one embodiment, the collimating lens 338 is mounted in an adjustable length lens tube, such as part no. SM1V10 available from Thor Labs of Newton, N.J., USA. The adjustable length lens tube has a threaded first portion which travels in an axial direction relative to a second portion. This allows an axial position of the collimating lens along the sensor's optical axis A to be adjusted, as depicted by the double-headed arrow 338a. This feature allows a user to control the distance between the collimating lens 338 and the first lens 336, thereby configuring the system 300 to efficiently collect scattered light at its nominal working range, which in one embodiment is from about 10 to about 20 meters. It is understood that the collimating lens 338 in system 300 may likewise be axially adjustable.

A detection-side polarizing beam splitter cube 334 is configured to split the linearly polarized backscattered light from the second circular polarization element 333 into first component linearly polarized backscattered light 340 and second component linearly polarized backscattered light 340.

In one embodiment, the first component linearly polarized backscattered light 340 passes through a detection-side linear polarizer 348 and a first condenser lens 342 which focuses the first component linearly polarized backscattered light 340 onto a first component light detector 344. Similarly, the second component linearly polarized backscattered light 350 passes through a second condenser lens 352 which focuses the former onto a second component light detector 354.

The output of each component light detector 344, 354 generally is subject to additional signal processing operations 346, 356 which may include filtering and amplification, as is known to those skilled in the art. Then, the output is applied to circuitry 360 for calculating one or more parameters which are reflective of the presence of ice in the cloud 302. In one embodiment, the circuitry 360 may comprise an application-specific integrated circuit or a processor. In another embodiment, the circuitry 360 may comprise discrete logic circuits such as comparators, adders, and the like. It is further understood that analog-to-digital converters and the like may also be included, if not already incorporated into the circuitry 360. In some embodiments, the one or more parameters may comprise a ratio of the outputs. In other embodiments, the one or more parameters may comprise a comparison of the outputs. Other, more complicated, parameters are also possible. After calculating any such parameters, the circuitry 360 may output one or more signals 370 to indicate the decision, signal an alarm, or the like.

Figure 19:
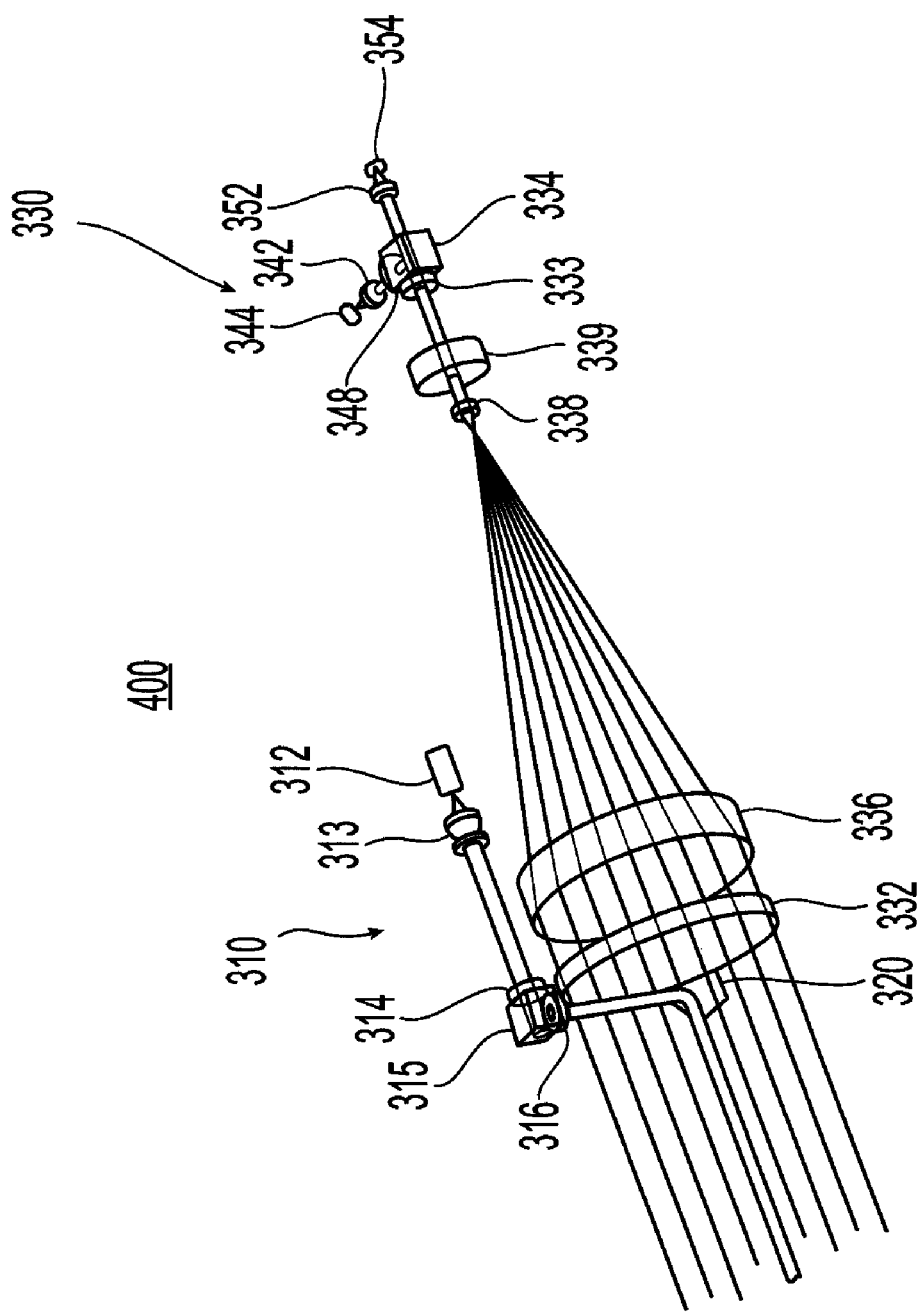
FIG. 19 shows an exemplary layout corresponding to the dual channel circular polarization sensor of FIG. 18.

FIG. 19 shows an exemplary layout of a system 400 having substantially the same components as the airborne cloud ice detection system 300 depicted in FIG. 18. As seen in FIG. 19, a circularizing and collimating optic 313 may be used to couple light from the optical beam emitter 312 to the illumination-side linear polarizer 314. In addition, the illumination-side polarizing beam splitter cube 315 redirects the output of the illumination-side linear polarizer 314 towards reflector 320.

In one embodiment, the detection-side polarizing beam splitter cube 334 has a high contrast ratio for the transmitted beam (200:1) and a low contrast ratio (20:1) for the reflected beam. Since there is always a significant amount of received light with the same polarization as the transmitted light, this polarization is passed into the reflected channel ("LHC Channel") which has the low contrast ratio and is associated with first component light detector 344. The orthogonal polarization that characterizes the presence of ice crystals passes into the direct channel ("RHC Channel") which has the high contrast ratio and is associated with the second component light detector 354. The rationale is that high contrast is needed to accurately detect the presence of ice, which is likely to be less prevalent in clouds than liquid water. To compensate for the low contrast ratio in the "water" channel, the additional linear polarizer 348 is added to improve the ratio. Polarization measurements of a prototype system show a contrast ratio of better than 400:1 for the "ice" detecting (RHC) channel and better than 50:1 for the "water" detecting (LHC) channel. The channels are labeled as "water detecting" and "ice detecting" according to the channel that is expected to show the greater signal for a pure water droplet cloud and for a pure ice crystal cloud. These correspond to the "parallel" and "perpendicular" polarization channels, respectively, in the linear polarization scheme. It is understood, however, that detection-side linear polarizer 348 may not be needed if the contrast ratio for the LHC channel were higher.

For a thin water cloud, if the illuminating beam is right circularly polarized ("RHC"), the reflected light is left circularly polarized ("LHC"). Furthermore, if the quarter wave plate 333 is set properly (i.e. the "fast axis" of the plate is at a 45° angle to the polarization axis of the beam splitter cube), all of the received light is converted into linearly polarized light that enters the first component light detector 344 ("LHC").

In the system 300, any light that is not circularly polarized will still pass through the second circular polarization element 333 and will be broken into its corresponding parallel and perpendicular linear components. Therefore, the system 300 may still exhibit "crosstalk" between channels when multiple scattering is present. However, the direction of circular polarization is a key parameter that will not change if the cloud is composed entirely of water.

The fourth Stokes component V (which specifies the direction of circular polarization) can be derived from the signal in the two component light detectors 344, 354 using the relation:

$$V \equiv \frac{I_{RHC} - I_{LHC}}{I_{total}} = \frac{I_{RHC} - I_{LHC}}{I_{RHC} + I_{LHC}},$$

Wherein $I_{LHC}$ and $I_{RHC}$ correspond to the intensities received at component light detectors 344, 354, respectively. In terms of the familiar depolarization ratio δ for a linear system, $$V = \frac{\delta - 1}{\delta + 1}$$

As the equation for V shows, the sign of V changes when δ (the ratio of the two orthogonal signals) passes through one. If the two signals are passed to the inputs of a comparator, the transition from water to ice can trigger a simple indicator, such as a light or an audible alarm, to indicate the presence of airborne ice crystals. Furthermore, the comparator can be altered to create a threshold alarm for whatever condition (pure ice or mixed phase) is desired. For example, if only a pure ice crystal cloud is considered hazardous to flight, the value of V should be ~0.27, and the comparator can alarm only when the ratio of the RHC to LHC signals (δ) exceeds 1.7.

One simple method of setting the threshold for the alarm is to alter the relative angle between the fast axis of the quarter wave plate 333 and the detection-side polarizing beam splitter cube 334 about the optical axis of the sensor. The quarter wave plate 333 converts circular polarization into two equal, orthogonal components of linear polarization, regardless of the orientation of the plate's fast axis. However, the relative orientation of the detection-side polarizing beam splitter cube 334 after the quarter wave plate 333 controls the relative proportion of components of linearly polarized light that enter the two component light detectors 344, 354. For example, in the case of a cloud composed entirely of ice crystals, the ratio of the signal at the RHC component light detector 354 (ice detecting channel) to the signal in the LHC component light detector 344 (water detecting channel) is 1.7, provided the fast axis of the quarter wave plate 333 is at 45° to the axis of the detection-side polarizing beam splitter cube 334. If the angle of the fast axis is rotated towards the LHC component light detector 344, the linear polarization axis of the light that enters the detection-side polarizing beam splitter cube 334 will also rotate and produce two nearly equal signals in the two component light detectors 344, 354. In such a case, the circuitry 360 may comprise a very simple, inexpensive comparator that sends a threshold alarm whenever the signals are equal, indicating the presence of an ice cloud. The exact rotation angle of the quarter wave plate 333 should be determined empirically, but the principle is the same, regardless of the desired threshold.

MFOV/Dual Channel Circular Polarization System Implementations

Figure 20:
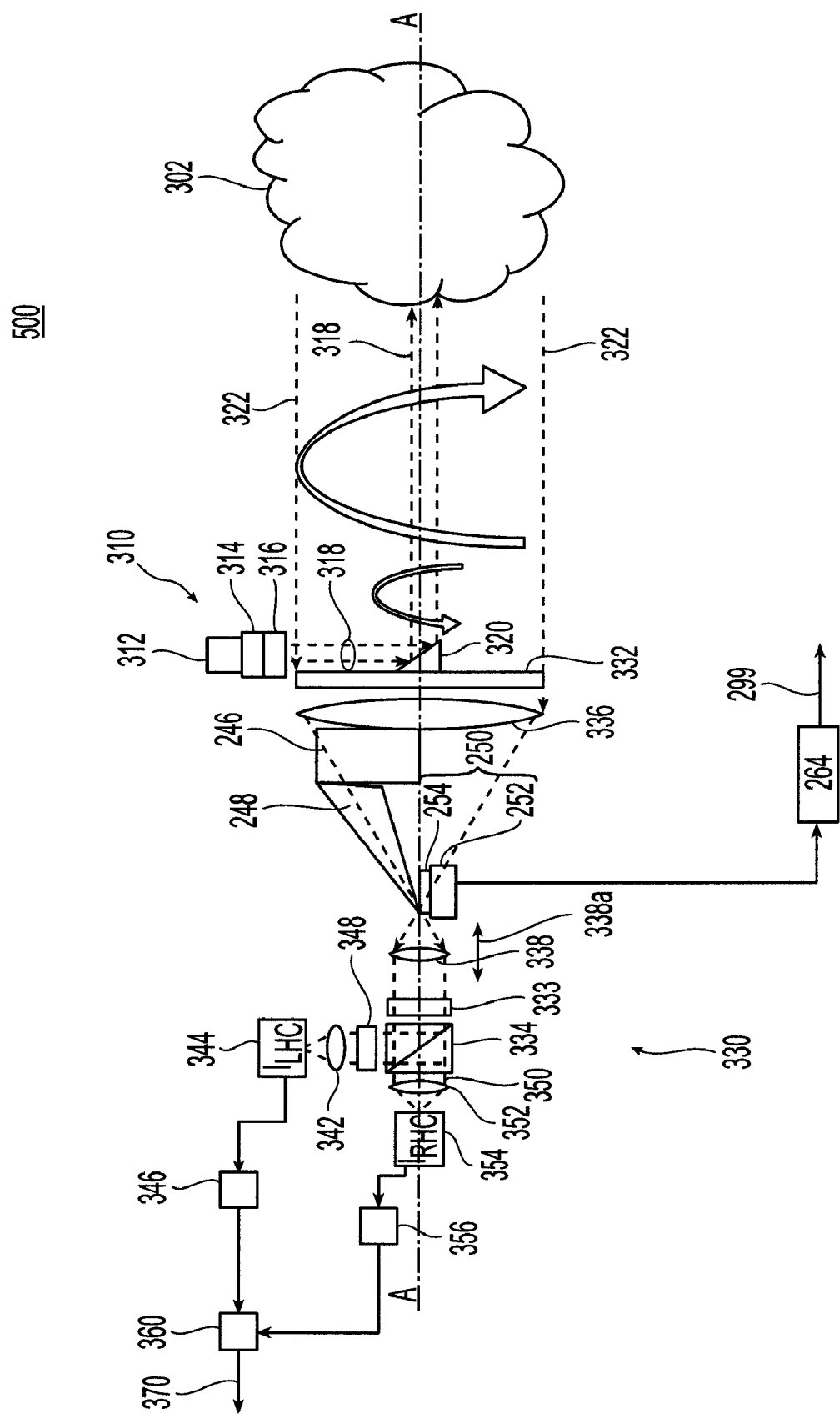
FIG. 20 shows one embodiment of an integrated system including the MFOV detector assembly of FIG. 16 and a dual channel polarization sensor.

FIG. 20 shows one embodiment of an integrated system 500, which comprises the MFOV detector assembly 240 embodiment of FIG. 16 in combination with the dual channel circular polarization sensor 300 of FIGS. 18 & 19. As seen in FIG. 20, the illumination portion 310 of the dual channel circular polarization sensor 300 can be used for both dual channel circular polarization and also for MFOV detection. At least a portion of the backscattered light 322 passing through the first lens 336 is directed along the kaleidoscope 246, reflected from the CLC 248 and is detected by the MFOV subsystem 250. The output of the MFOV subsystem 250 detector 252 is directed to MFOV detector circuitry 264 described above with respect to FIG. 16. It is understood, however, that MFOV detector circuitry 264 and dual channel circular polarization circuitry 360 may be combined into a single common circuit so that decision signals 299, 370 are output by such a common circuit.

Figure 21:
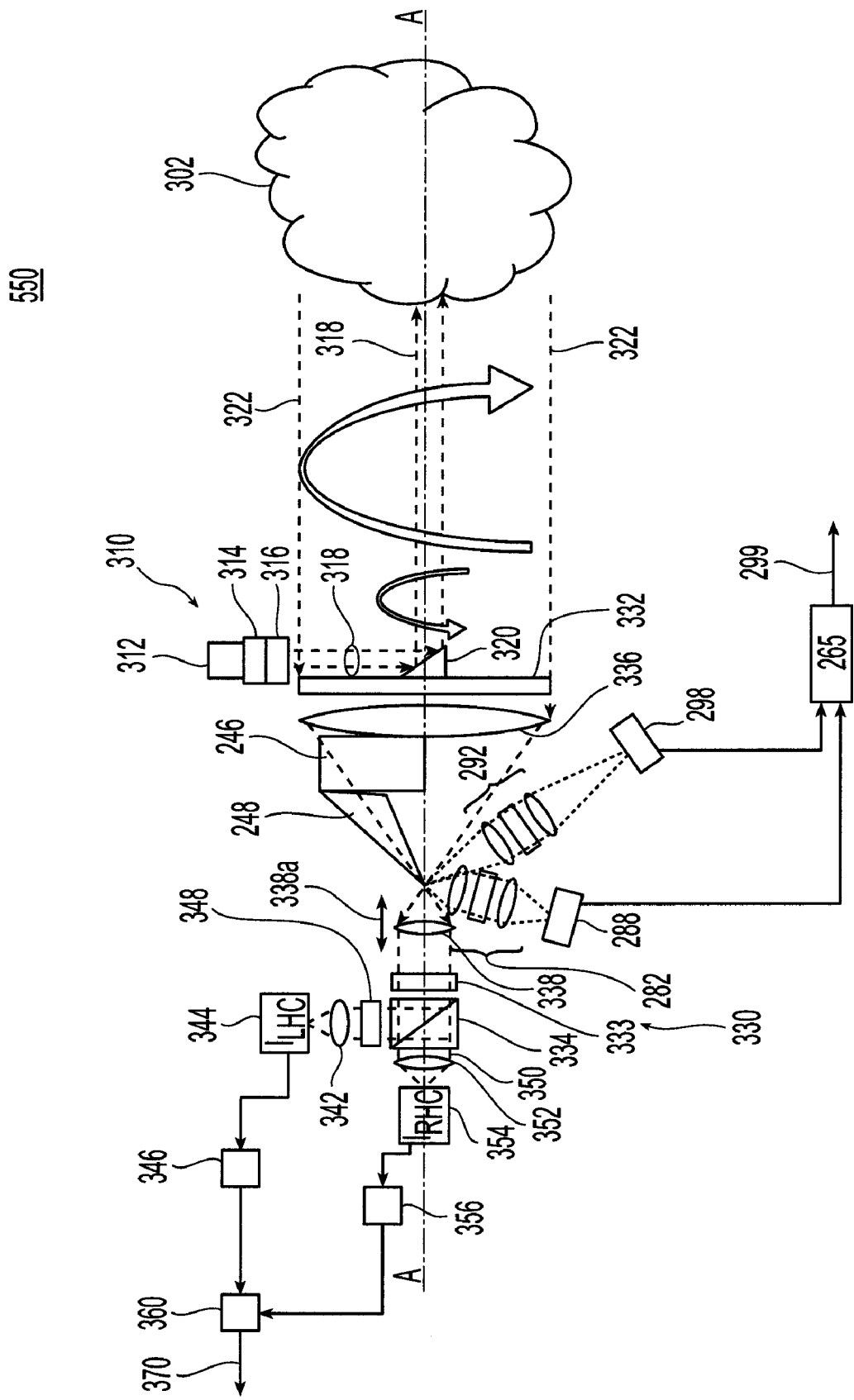
FIG. 21 shows another embodiment of an integrated system including the MFOV detector assembly of FIG. 17 and a dual channel polarization sensor.

FIG. 21 shows another embodiment of an integrated system 550, which comprises the MFOV detector assembly 270 embodiment of FIG. 17 in combination with the dual channel circular polarization sensor 300 of FIGS. 18 & 19. Again, the illumination portion 310 of the dual channel circular polarization sensor 300 can be used for both dual channel circular polarization and also for MFOV detection. At least a portion of the backscattered light passing through the first lens 336 is directed along the kaleidoscope 246, reflected from the CLC 248 and is detected by the MFOV subsystem 280. The output of the MFOV subsystem 250 detectors 288, 298 are directed to MFOV detector circuitry 265 described above with respect to FIG. 17. It is understood, however, that MFOV detector circuitry 265 and dual channel circular polarization circuitry 360 may be combined into a single common circuit so that decision signals 299, 370 are output by such a common circuit.

MFOV Implementations

Figure 22:
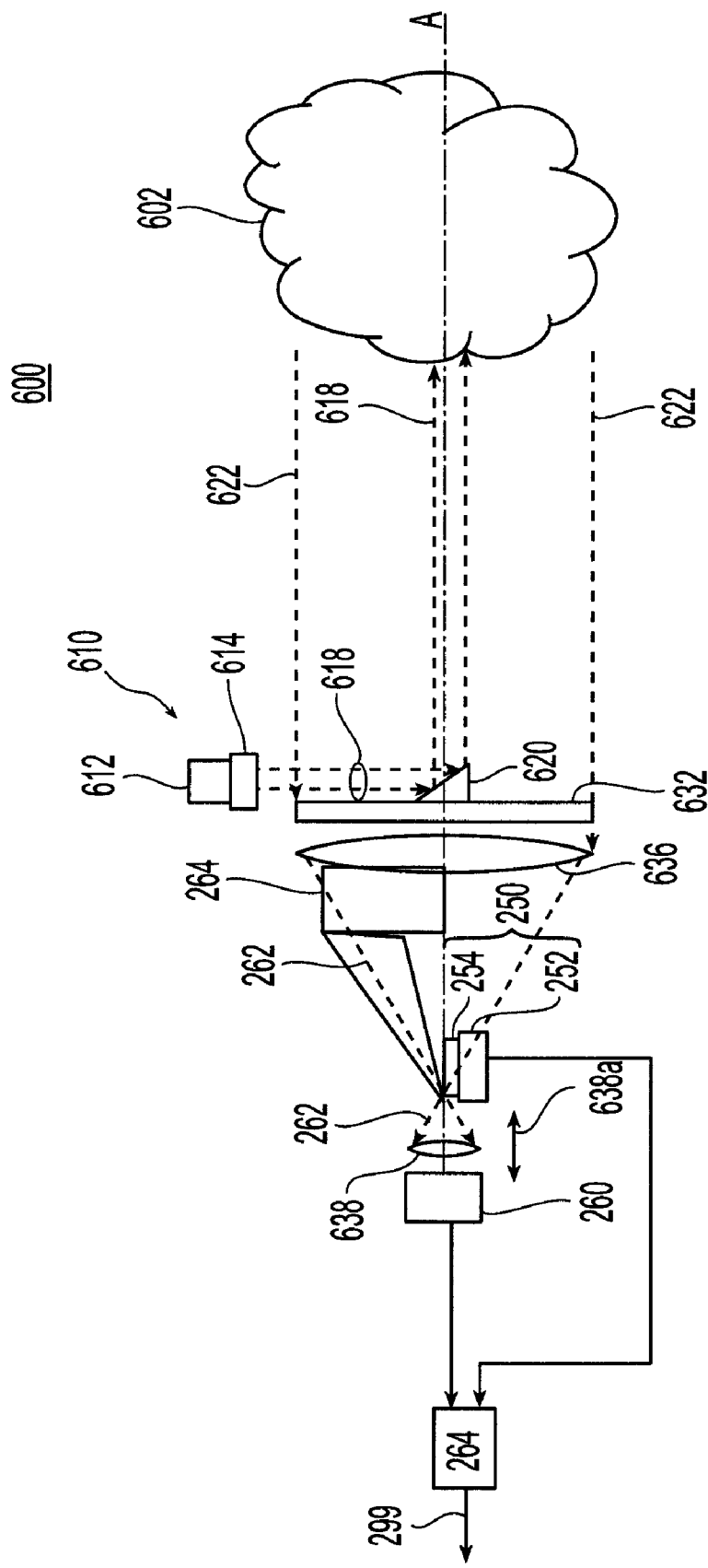
FIG. 22 shows one embodiment of a standalone MFOV system including the MFOV detector assembly of FIG. 16 and an illumination portion.
Figure 23:
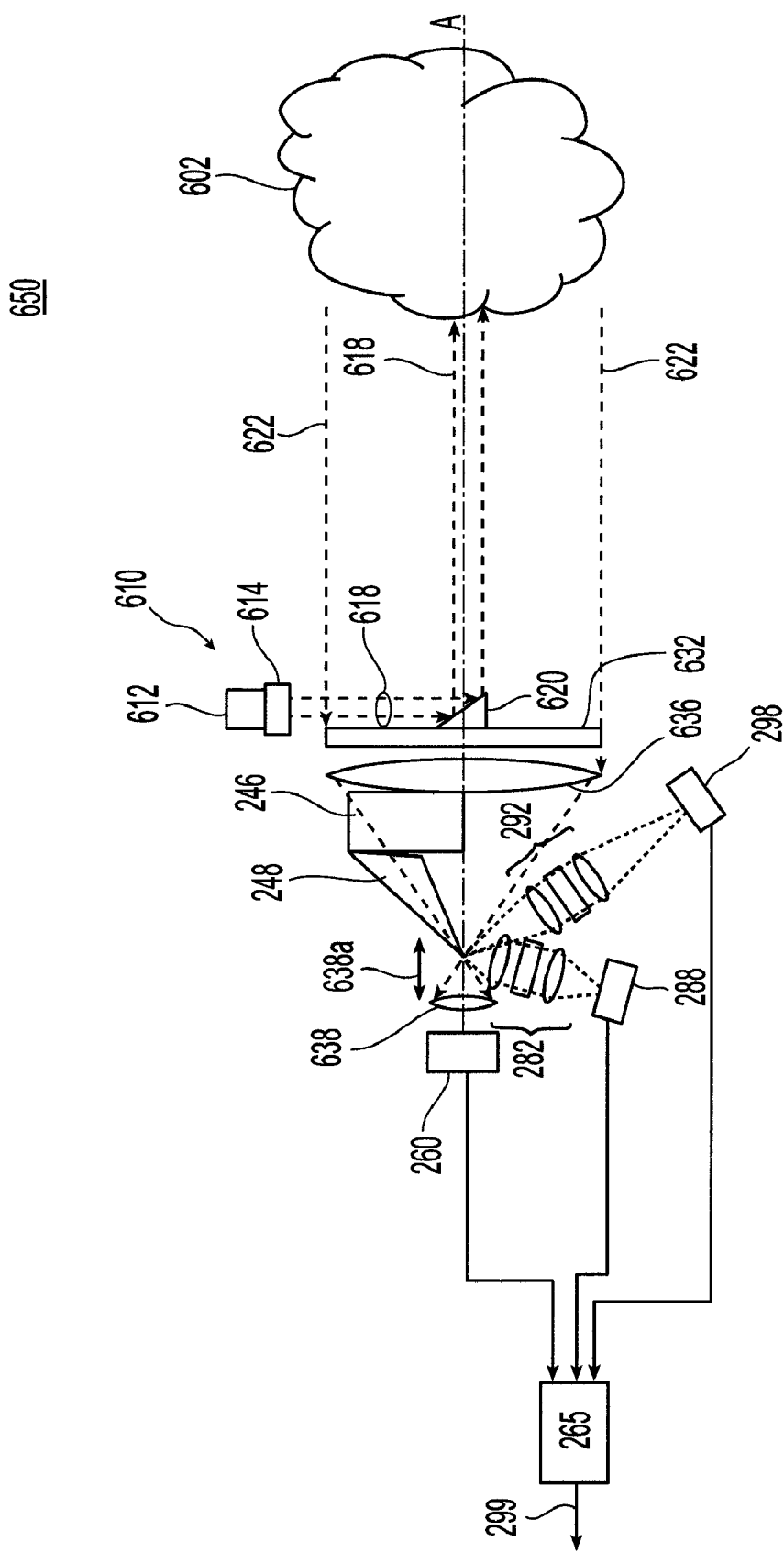
FIG. 23 shows another embodiment of a standalone MFOV system including the MFOV detector assembly of FIG. 17 and an illumination portion.

FIGS. 22 and 23 depict embodiments of standalone MFOV systems 600, 650 incorporating the MFOV detector assemblies 240, 270, respectively, without a dual channel circular polarization sensor 300. As such, systems 600, 650 do not require polarized light.

As seen in both FIGS. 22 and 23, the illumination portion 610 includes an optical beam emitter 612 which outputs a first light beam. The optical beam emitter 612 may comprise a laser or, alternatively, a light emitting diode whose output is linearly polarized. An illumination-side linear polarizer 614 helps ensure high polarization purity by receiving the first light beam (which may already be linearly polarized) from the optical beam emitter 612 and outputting a linearly polarized illuminating beam 618. In one embodiment, the illumination-side linear polarizer 614 is model number DP-050-NIR2-2, available from Meadowlark Optics, of Frederick, Colo. (USA).

In the MFOV systems 600, 650, the illumination portion 610 also includes a reflector 620 configured to reflect the linearly polarized illuminating beam 618 along an optical illumination axis A of the MFOV systems 600, 650 and in the direction of a cloud 602. The reflector 620 must not alter the linear polarization. While the illumination portion 610 is shown as directing the linearly polarized illuminating beam 618 in the direction of a cloud 602, it is understood that during use the MFOV systems 600, 650 are mounted on an aircraft which may be passing through a cloud. Also, it is noted here that the MFOV systems 600, 650 typically are configured to detect supercooled liquid droplets beyond the slipstream of the aircraft, and preferably up to 10 to 20 meters from the skin of the aircraft. As is known to those of ordinary skill in the art, the range is determined by the time delay between the transmission of a laser pulse from the optical beam emitter 612, and the reception of the pulse by the MFOV detector.

The linearly illuminating beam 618 illuminates a volume of space in the cloud 602. In response, water droplets and ice crystals within that instantaneous volume of space in the cloud 602 causes backscattering of the linearly polarized illuminating beam 618, thereby creating backscattered light 622 which travels in the direction of the detector assemblies 240 (FIG. 22) and 270 (FIG. 23). The backscattered light passes through a window 632 and then a first lens 636 for focusing the backscattered light 622.

A collimating lens 638 configured to receive the single scattered light is mounted in an adjustable length lens tube, such as part no. SM1V10 available from Thor Labs of Newton, N.J., USA. The adjustable length lens tube has a threaded first portion which travels in an axial direction relative to a second portion. This allows an axial position of the collimating lens along the sensor's optical axis A to be adjusted, as depicted by the double-headed arrow 638a. This feature allows a user to control the distance between the collimating lens 638 and the first lens 636, thereby configuring the MFOV systems 600, 650 to efficiently collect single scattered light at its nominal working range, which in one embodiment is from about 10 to about 20 meters.

As seen in FIG. 23, in MFOV system 600, at least a portion of the backscattered light 622 passing through the first lens 636 is directed along the kaleidoscope 246, reflected from the CLC 248 and is detected by the MFOV subsystem 250. The output of the MFOV subsystem's 250 detector 252 is directed to MFOV detector circuitry 264 described above with respect to FIG. 16. Meanwhile, the single FOV subsystem 260, implemented as a photodiode or beamstop, captures light from single scattering 262, and also sends it output to MFOV detector circuitry 264. MFOV detector circuitry 264, in turn, calculates one or more parameters reflective of the presence of supercooled water droplets, ice and other environmental and/or weather conditions, and outputs signals 299 to indicate the decision, signal an alarm, or the like.

As seen in FIG. 23, in MFOV system 660, at least a portion of the backscattered light 622 passing through the first lens 636 is directed along the kaleidoscope 246, reflected from the CLC 248 and is detected by the MFOV subsystem 280. The output of the MFOV subsystem's 280 detectors 288, 298 are directed to MFOV detector circuitry 265 described above with respect to FIG. 17. Meanwhile, the single FOV subsystem 260, implemented as a photodiode or beamstop, captures light from single scattering 262, and sends it output to MFOV detector circuitry 265. MFOV detector circuitry 265, in turn, calculates one or more parameters reflective of the presence of supercooled water droplets, ice and other environmental and/or weather conditions, and outputs signals 299 to indicate the decision, signal an alarm, or the like.

While the present invention has been described herein above in connection with a plurality of aspects and embodiments, it is understood that these aspects and embodiments were presented by way of example with no intention of limiting the invention. Accordingly, it is therefore understood that various components and aspects of embodiments may be combined, as appropriate. Accordingly, the present invention should not be limited to any specific embodiment or aspect, but rather construed in breadth and broad scope in accordance with the recitation of the claims appended hereto.

What is claimed is:

1. An airborne multiple field of view water droplet sensor, comprising:
   an illumination portion comprising:
      a first optical beam emitter configured to output a light beam; and
   a detection portion comprising:
      a window configured to permit backscattered light from water droplets illuminated by said light beam to pass therethrough;
      a first lens configured to focus said backscattered light after the backscattered light has passed through said window;

a kaleidoscope configured to channel a first portion of the backscattered light that has passed through the first lens, towards an inner reflective surface of a circle-to-line converter;

a multiple field of view subsystem comprising at least a first detector configured to receive light reflected by the circle-to-line converter; and a single field of view subsystem configured to receive a second portion of the backscattered light that has passed through the first lens, the second portion not having been reflected by the circle-to-line converter.

2. The airborne multiple field-of-view water droplet sensor according to claim 1, further comprising:

a fiber optic plate positioned between the inner reflective surface of the circle-to-line converter and the first detector, the fiber optic plate configured to transfer an optical image reflected by the circle-to-line converter.

3. The airborne multiple field-of-view water droplet sensor according to claim 1, wherein the multiple field of view subsystem further comprises:

a second detector, the second detector also configured to receive light reflected by the circle-to-line converter, wherein:

the second detector is configured to detect reflected, backscattered light corresponding to field of view angles larger than those detected by the first detector.

4. The airborne multiple field-of-view water droplet sensor according to claim 3, wherein each of the first and second detectors comprise a linear array of detector elements.

5. The airborne multiple field-of-view water droplet sensor according to claim 3, further comprising:

a first set of optical elements positioned between a focal plane of the circle-to-line converter and the first detector, wherein the first set of optical elements amplifies small field of view reflections from the circle to line converter; and a second set of optical elements positioned between the focal plane of the circle-to-line converter and the second detector.

6. The airborne multiple field-of-view water droplet sensor according to claim 5, wherein the first set of optical elements comprises:

at least two lenses; and a bandpass filter interposed between the two lenses.

7. The airborne multiple field-of-view water droplet sensor according to claim 1, wherein:

the circle-to-line converter comprises a tapered area having a varying slope; and a slope of an internal reflective surface of the tapered area proximate to the apex is under 1.0.

8. The airborne multiple field-of-view water droplet sensor according to claim 1, wherein the single field of view subsystem comprises a beamstop.

9. The airborne multiple field-of-view water droplet sensor according to claim 1, wherein the single field of view subsystem comprises a photodiode.

10. The airborne multiple field-of-view water droplet sensor according to claim 1, further comprising:

a collimating lens interposed between the first lens and the single field of view subsystem; wherein:

a position of the collimating lens is axially adjustable along an optical axis of the sensor.

11. The airborne multiple field-of-view water droplet sensor according to claim 1, wherein the first optical beam emitter comprises at least one from the group consisting of:

a light emitting diode whose output is linearly polarized; and a laser.

12. The airborne multiple field-of-view water droplet sensor according to claim 11, further comprising:

a reflector configured to reflect the light beam along an optical illumination axis of the sensor.

13. The airborne multiple field-of-view water droplet sensor according to claim 1, further comprising:

a processor configured to receive signals output by the multiple field of view subsystem and said single field of view subsystem, and calculate at least one parameter reflective of a water droplet condition, based on said signals from the two subsystems.

14. The airborne multiple field-of-view water droplet sensor according to claim 1, wherein the single field of view subsystem employs circularly polarized light to distinguish between water and ice crystals.

15. The airborne multiple field-of-view water droplet sensor according to claim 14, wherein:

the illumination portion further comprises:

a first linear polarizer configured to receive the light beam and output a linearly polarized illuminating beam;

a first circular polarization element configured to receive the linearly polarized illuminating beam and output a circularly polarized illuminating beam; and the detection portion further comprises:

a second circular polarization element configured to receive the circularly polarized backscattered light that has passed through the window and output linearly polarized backscattered light;

a first polarizing beam splitter configured to split the linearly polarized backscattered light into a first component linearly polarized backscattered light and a second component linearly polarized backscattered light;

a first component light detector configured to detect the first component linearly polarized backscattered light and output a first signal in response thereto;

a second component light detector configured to detect the second component linearly polarized backscattered light and output a second signal in response thereto; and a processor configured to receive the first and second signals output by respective first and second component light detectors, and calculate at least one parameter reflective of an ice condition, based on said first and second signals.

16. The airborne multiple field-of-view water droplet sensor according to claim 15, further comprising:

a second linear polarizer interposed between the first polarizing beam splitter and the first component light detector, the second linear polarizer configured to further linearly polarize the first component linearly polarized backscattered light, prior to detection by the first component light detector.

17. The airborne multiple field-of-view water droplet sensor according to claim 15, wherein:

the first circular polarization element comprises a first quarter wave plate; and the second circular polarization element comprises a second quarter wave plate.

18. The airborne multiple field-of-view water droplet sensor according to claim 15, further comprising:

a reflector configured to reflect the circularly polarized illuminating beam along an optical illumination axis of the sensor;

a second linear polarizer interposed between the first polarizing beam splitter and the first component light detector, the second linear polarizer configured to further linearly polarize the first component linearly polarized backscattered light, prior to detection by the first component light detector;

a processor configured to receive the first and second signals output by respective first and second component light detectors, and calculate at least one parameter reflective of an ice condition, based on said first and second signals.

19. The airborne multiple field-of-view water droplet sensor according to claim 18, further comprising:

a first lens interposed between the window and the second circular polarization element;

a second lens interposed between the first linear polarizer and the first component light detector;

a third lens interposed between the second linear polarizer and the second component light detector; and a collimating lens interposed between the first lens and the second circular polarization element.

20. The airborne multiple field-of-view water droplet sensor according to claim 19, wherein:

the second and third lenses are condenser lenses; and a position of the collimating lens is axially adjustable along an optical axis of the sensor.

* * * * *